(12) United States Patent
Kludas et al.

(10) Patent No.: US 8,390,794 B2
(45) Date of Patent: *Mar. 5, 2013

(54) OPTICAL INSTRUMENT AND METHOD FOR OBTAINING DISTANCE AND IMAGE INFORMATION

(75) Inventors: Torsten Kludas, Zottelstadt (DE); Michael Vogel, Schleifreisen (DE); Christian Grasser, Vallentuna (SE); Set Svanholm, Sollentuna (SE)

(73) Assignee: Trimble Jena GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,559

(22) Filed: Nov. 21, 2011

(65) Prior Publication Data
US 2012/0062868 A1 Mar. 15, 2012

Related U.S. Application Data

(63) Continuation of application No. 12/507,755, filed on Jul. 22, 2009, now Pat. No. 8,085,387.

(51) Int. Cl.
*G01C 3/08* (2006.01)

(52) U.S. Cl. ......... 356/4.01; 356/3.01; 356/3.1; 356/4.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS
2003/0048438 A1* 3/2003 Kawamura et al. ........ 356/141.1
* cited by examiner

*Primary Examiner* — Luke Ratcliffe
(74) *Attorney, Agent, or Firm* — Kilpatrick Townsend & Stockton LLP

(57) ABSTRACT

An optical instrument and a method for obtaining distance and image information of an object is disclosed to improve the speed and accuracy of data acquisition. The instrument comprises a camera, positioning unit, distance measuring unit, lens arrangement and control unit. The camera acquires images of an object and the control unit defines an area to be scanned and measurement pixels of an object in the image, wherein the measurement pixels are converted into an approximation of coordinates of positions to be measured assuming a default distance to the positions, and the optical axis of the lens arrangement is adjusted sequentially onto the positions to be measured. After measuring the distances to the positions, the coordinates are recalculated increasing the accuracy of the coordinates.

20 Claims, 16 Drawing Sheets

OPTICAL INSTRUMENT AND METHOD FOR OBTAINING DISTANCE AND IMAGE INFORMATION

CROSS-REFERENCES TO RELATED APPLICATIONS

This application is a continuation of U.S. patent Ser. No. 12/507,755, filed on Jul. 22, 2009, which is a continuation of International Patent Application No. PCT/EP2007/000706, filed on Jan. 26, 2007, the disclosures of which are hereby incorporated by reference in their entirety for all purposes.

BACKGROUND OF THE INVENTION

The present invention relates to an optical instrument and a method for obtaining distance and image information of an object.

Optical Instruments, and in particular optical instruments, such as video tachymeters or video total stations, comprise a complex arrangement of optical elements such as lenses of a telescope, a camera and distance measuring means for obtaining information regarding the shape and the location of an object. This information may include horizontal and vertical angles and a distance to the object as well as an image of the object. The information may then be used to create a three-dimensional representation of the object.

However, after acquiring an image with such an optical instrument, the acquisition of three-dimensional data is time consuming. For example, for measuring a three-dimensional grid, the instrument has to sequentially scan by tilting and panning the distance measuring means and measure each position corresponding to a point in the grid, which is time consuming.

To generate a grid, it is desired to obtain a distance measurement for multiple positions corresponding to multiple pixels in an image. However, the correspondence between a pixel taken by the camera and a position to be measured may not be linear so that obtaining the coordinates of the exact position to be measured is difficult and thus distance measurements may vary. Therefore, there is a need for higher accuracy in positioning and distance measurement.

Other optical surveying instruments with imaging, direction and distance measuring capabilities often comprise scanning means for obtaining image, direction and distance information, where a fast rotating polygon mirror for laser beam deflection is used. Specifically, a laser beam of a distance measuring means is scanned over the object, while a distance to a position on the object is measured and the direction, e.g. indicated by horizontal and vertical angles, to the position on the object with respect to the origin or mirror position of the instrument is recorded.

Such instruments are capable of providing images of the object at video rate including distance information of each scanned position on the object. Thereby, multiple data points corresponding to the measured positions may be obtained, wherein each data point may comprises three-dimensional information. Of course, the higher the requirements on the resolution, the more data points need to be obtained, leading to a vast amount of information that has to be processed, which is often only possible offline.

While the above discussed instruments may obtain three-dimensional representations of an object with sufficient resolution for many applications, some applications require still higher resolution and a higher accuracy. Moreover, in the mirror scanning systems, it is not possible to obtain a second distance measurement of the exact same position, since it is not possible to obtain the exact same laser beam deflections on, for example, the rotating polygon mirror twice. Further, since processing of the large amount of data has to be done usually offline back in the office, the operator cannot return to features of interest on site. Thus, although fairly high resolution is obtained for the whole scanning area, this turns into a disadvantage if data corresponding to a few features of interest in the scanned area have to be isolated.

SUMMARY OF THE INVENTION

It is therefore desirable to provide an optical instrument and method with improved data acquisition for improving image acquisition and the accuracy and speed of distance measurements.

According to an embodiment, an optical instrument for obtaining distance and image information of an object, comprises a lens arrangement for sighting the object, a camera aligned with the optical axis of the lens arrangement for acquiring an image of at least part of the object, a distance measuring unit for measuring a distance to the object along a measurement axis of the distance measuring unit parallel to the optical axis of the lens arrangement, a positioning unit for adjusting the optical axis of the lens arrangement relative to at least one reference axis, and a control unit having a first control element adapted to define in the image an area to be scanned, to obtain a plurality of measurement pixels of the object within the area and to convert the plurality of measurement pixels into an approximation of coordinates of a plurality of positions to be measured assuming a default distance between the plurality of positions and the optical instrument, and a second control element adapted to instruct the positioning unit to adjust the optical axis of the lens arrangement onto the plurality of positions to be measured and to instruct the distance measuring unit to measure the distances to the plurality of positions, wherein the first control element is further adapted to recalculate the coordinates of the plurality of positions based on the measured distances. Accordingly, the horizontal and vertical directions and distances of a plurality of positions on the object may be precisely measured, since the positioning unit is used to adjust the optical axis of the lens arrangement anew for each measurement, and the exact coordinates of the positions are recalculated based on the measured distances constituting an iterative process.

According to an advantageous example, the first control element is adapted to obtain the plurality of measurement pixels of the object by an operator for selecting the plurality of measurement pixels in the area or by processing the area in the image using a detection algorithm for detecting the plurality of measurement pixels in the area. Accordingly, an operator may first study the image for positions of interest or may use an automatic detection algorithm, such as an automatic image processing algorithm, to reduce the positions to be measured to prominent positions being representative for the positions of the area of interest.

According to another advantageous example, the first control element is adapted to define the area to be scanned by an operator for selecting the area in the image or by processing the image using a detection algorithm for detecting the area in the image. Accordingly, it can be avoided to measure distances for each position in the image, and an operator may first study the image for areas of interest or may use an automatic detection algorithm to reduce the area to be scanned to a detected object.

According to another advantageous example, the first control element is adapted to obtain an object feature of the object in the area and to define in the area the plurality of measurement pixels at core positions on the object. Accordingly, instead of obtaining distance information of positions not of interest, an object feature is selected by an operator or a detection algorithm and core positions, such as positions close to the object feature, are defined to further reduce the area to be scanned and obtain a good approximation for the positions of the object feature.

According to another advantageous example, the first control element is adapted to define in the area to be scanned at least one of a region with a high measurement pixel density, a region with a low measurement pixel density and a region without measurement pixels. Accordingly, different regions in the area may be defined with different priorities so that a time for position adjustments and measuring distances, as well as the amount of data is reduced.

According to another advantageous example, the first control element is adapted to define the regions by an operator for selecting the regions in the area or by processing the area using a detection algorithm for detecting the regions in the area. Accordingly, an operator may first study the area to be scanned to accurately define regions, e.g. with different priorities or alternatively, a detection algorithm may automatically provide a fast categorization in this respect.

According to another advantageous example, the second control element is adapted to scan the measurement pixels in the area in a sequence so as to minimize an adjustment of the optical axis of the lens arrangement. Accordingly, when for example, scanning a ring-shaped object, a conventional horizontal line scan can be avoided, rather the object may, e.g. be scanned around its circumference so that the measurement pixels around the ring-shape are subsequently scanned with a minimal adjustment of the optical axis of the lens arrangement for each step, reducing the measurement time.

According to another advantageous example, the first control element is adapted to obtain the plurality of measurement pixels in the area by introducing a two-dimensional representation of a profile into the area and by selecting a plurality of pixels at an outline of the two-dimensional representation of the profile in the area as the measurement pixels. Accordingly, the distribution of measurement pixels in the area to be scanned may be adjusted according to an actual profile of the object to be measured, such as a cylindrical profile when measuring positions in a tunnel.

According to another advantageous embodiment, the first control element is further adapted to define the area to be scanned by connecting the plurality of measurement pixels so that the plurality of measurement pixels constitute corners of a polygon and to define a plurality of polygon positions to be measured in the area defined by the polygon. Accordingly, an area to be scanned is easily defined by a few measurement pixels framing the area and remaining polygon positions may accurately be measured without any recalculation of their coordinates.

According to another advantageous example, the first control element is adapted to define the plurality of polygon positions in the area by an operator for selecting the plurality of polygon positions in the area or to define polygon measurement pixels by processing the area using a detection algorithm for detecting an object feature of the object in the area. Accordingly, the distribution of measurement pixels in the area defined by the polygon may vary with features of the object in the area of the polygon, reducing the measurement time.

According to another advantageous example, the image comprises at least a first and a second sub image and at least two sub images comprise the plurality of measurement pixels. Accordingly, the image may be composed of several sub images with measurement pixels in each sub image or in only one sub image.

According to another advantageous example, the first control element is adapted to define other positions to be measured between the plurality of measurement pixels of the first sub image and the second sub image. Accordingly, positions to be measured are not limited to positions corresponding to measurement pixels of the sub image and distance information is also obtainable from positions not shown on any sub image.

According to another advantageous example, the first control element is adapted to define the other positions to be measured by processing at least one of the first sub image and the second sub image by defining the other positions along a line connecting at least two measurement pixels or by using an extrapolation algorithm for extrapolating an edge or other object feature of the object in at least one of the first sub image and second sub image detected by a detection algorithm. Accordingly, positions to be measured are not limited to positions corresponding to measurement pixels of the sub image.

According to another advantageous example, the second control element is adapted to instruct the positioning unit to adjust the optical axis of the lens arrangement sequentially onto the plurality of polygon or other positions and to instruct the distance measuring unit to measure the distances to the plurality of polygon or other positions. Accordingly, positions to be measured are not limited to positions corresponding to measurement pixels.

According to another advantageous example, the conversion is performed using a conversion algorithm using the distances to the plurality of positions. Accordingly, a conversion of measurement pixels into positions may be achieved, which is very accurate, since it takes into account the distance to the positions.

According to another advantageous example, the first control element is adapted to calculate the number of sub images needed to compose the image. Therefore, the exact number of sub images needed to compose the whole image may be obtained as well as an approximation of the time needed.

According to another embodiment, a method for obtaining distance and image information of an object comprises sighting the object with a lens arrangement, acquiring an image of at least part of the object with a camera aligned with the optical axis of the lens arrangement, defining in the image an area to be scanned, obtaining a plurality of measurement pixels of the object within the area, converting the plurality of measurement pixels into an approximation of coordinates of a plurality of positions to be measured assuming a default distance to the plurality of positions, adjusting the optical axis of the lens arrangement sequentially onto the plurality of positions to be measured, measuring the distances to the plurality of positions and recalculating the coordinates of the plurality of positions based on the measured distances.

According to another embodiment, a program may be provided including instructions adapted to cause data processing means to carry out a method with the above features.

According to another embodiment, a computer readable medium may be provided, in which a program is embodied, where the program is to make a computer execute the method with the above features.

According to another embodiment, a computer program product may be provided, comprising the computer readable medium.

Further advantageous features of the invention are disclosed in the claims.

DETAILED DESCRIPTION OF SPECIFIC EMBODIMENTS

Preferred embodiments of the invention are described with reference to the Figures. It is noted that the following description contains examples only and should not be construed as limiting the invention.

Embodiments of the invention generally relate to obtaining distance and image information of an object, and particularly, to improve the speed of data acquisition by intelligently selecting positions to be measured and to improve the accuracy of data acquisition by recalculating coordinates of selected positions on an object. Briefly said, an image is acquired with a camera and an area to be scanned and measurement pixels of an object are defined in the image, wherein the measurement pixels are converted into an approximation of coordinates of positions to be measured assuming a default distance to the positions, and the optical axis of a lens arrangement is adjusted sequentially onto the positions to be measured and after measuring the distances to the positions, the coordinates are recalculated.

Figure 1:
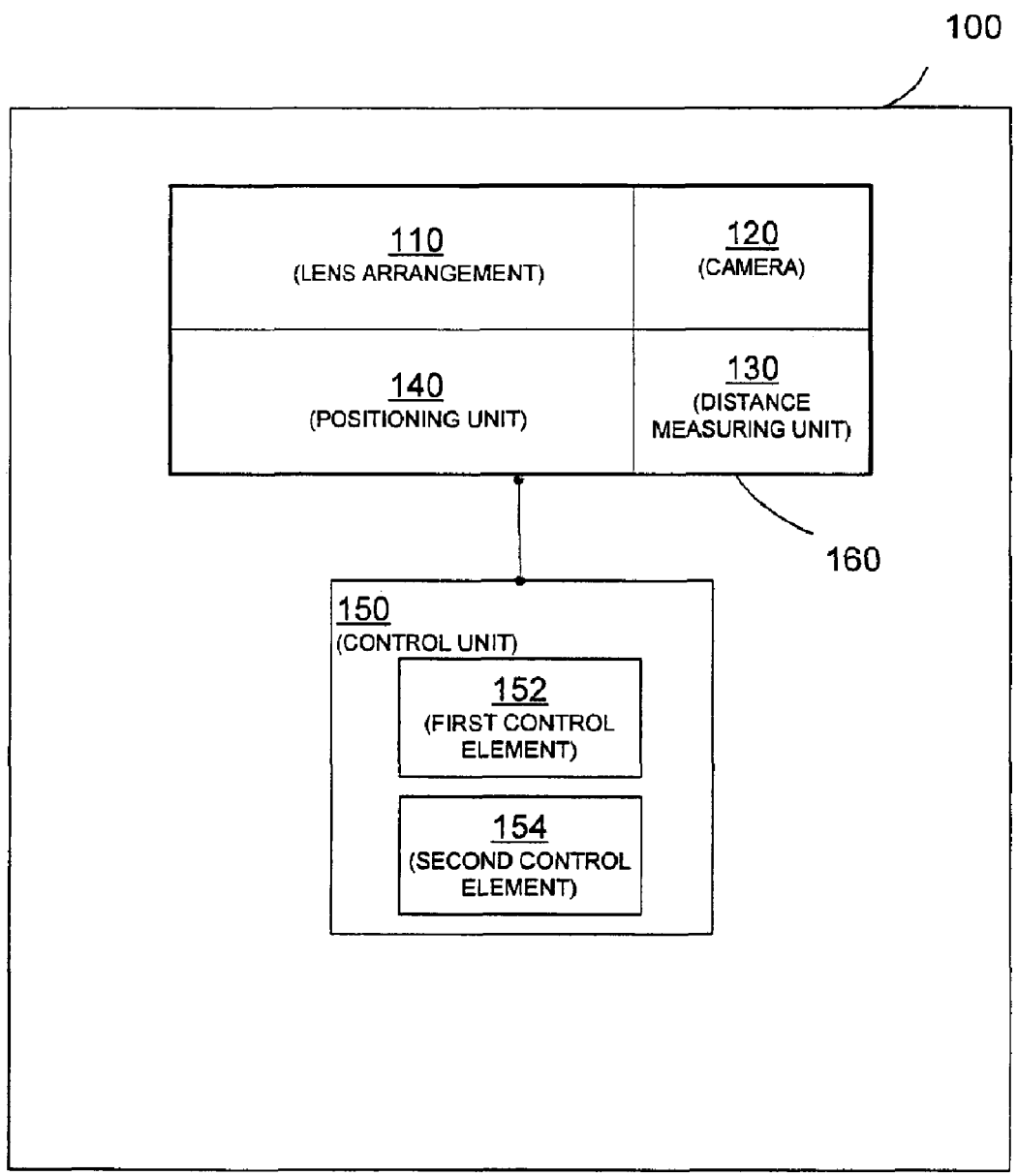
FIG. 1 illustrates an optical instrument according to an embodiment of the invention.

FIG. 1 illustrates elements of an optical instrument 100 according to an embodiment of the invention, comprising a control unit 150 and an acquisition unit 160.

The control unit 150 is connected to the acquisition unit 160 to exchange data, for example, the control unit may instruct the acquisition unit 160 to acquire data and the acquired data is sent to the control unit 150. Any type for data transmission is conceivable, such as fixed line or wireless data transmission.

The control unit 150 comprises a first control element 152 and a second control element 154, which may be realized by a hardware arrangement, such as by hard wired circuits, or ASICs (application specific integrated circuits) or software or any suitable combination of the above. The functions performed by the first control element 152 and the second control element 154 will be described in detail below.

The acquisition unit 160 comprises a lens arrangement 110, a camera 120, a distance measuring unit 130 and a positioning unit 140, wherein the operations of these elements are controlled by the control unit 150.

In an example the lens arrangement 110 includes a focusing lens movable along a mechanical path in order to focus onto an object and preferably at least two lenses forming a telescope, the lens arrangement for sighting the object defining an optical axis.

The camera 120 aligned with the optical axis of the lens arrangement for acquiring an image of at least part of the object and preferably positioned behind the lens arrangement in its image plain, may be constituted by any suitable imaging device, for example, a two-dimensional array of sensor elements capable of generating image information with a number of pixels generally corresponding to the number of elements of the array, such as a charge-coupled device (CCD) camera or a complementary metal-oxide semiconductor (CMOS) camera. Such a sensor array may be composed of 1000×1000 sensor elements to generate digital images with $10^6$ image pixels. In an optical instrument, such as a video tachymeter or tachometer, the actual viewing direction may be defined by a line of sight from a point on or one of the elements of the two-dimensional arrangement of sensor elements, e.g. near or at the centre of the array, and through the at least one lens.

The distance measuring unit 130 of the acquisition unit 160 is provided for measuring a distance from the optical instrument to the object along a measurement axis of the distance measuring unit parallel to the optical axis of the lens arrangement. Alternatively, the measurement axis may also coincide with the optical axis.

Further, the distance measuring unit 130 provides a corresponding measurement value to the control unit 150. For example, the distance measuring unit 130 includes a coherent light source, such as an infrared laser or another suitable laser distance measuring device as known in the art, and preferably a fast reflector-less working EDM.

The positioning unit 140 is provided for adjusting the optical axis of the lens arrangement relative to at least one reference axis. For example, the positioning unit 140 is realized by an electro-mechanical arrangement comprising preferably magnet servo drives or any other fast drives for precisely positioning the acquisition unit 160.

It is noted that the positioning unit 140 in FIG. 1 is shown as forming part of the acquisition unit 160 but the positioning unit may also be provided independently in the optical instrument, since it serves to move the lens arrangement 110, camera 120 and distance measuring unit 130 to a position enabling to sight the object and optionally take a distance measurement at this position of the object.

Since the positioning unit 140 includes movable components, such as drives, parts of the positioning unit maintain their position in space, i.e. their position is fixed with respect to, for example, a tripod, on which the optical instrument is placed, and parts of the positioning unit 140 move in space with respect to a fixed coordinate system, for example, defined by an intersection point of all three axes of the optical instrument, referred to the origin, and its alignment with a base, such as a tripod, stand or other support (not shown).

During operation of the arrangement shown in FIG. 1 the control unit 150 controls the acquisition unit 160, thereby the first control element 152 defines in an acquired image an area to be scanned, obtains an object feature of the object in the area and defines in the area a plurality of measurement pixels corresponding to a plurality of positions on the object with an increased density of measurement pixels at the object feature.

After the measurement pixels are defined in the area of the image, the directions corresponding to the positions are obtained and transmitted to the second control element 154. Subsequently, the second control element 154 instructs the positioning unit to adjust the optical axis of the lens arrangement sequentially on the plurality of positions on the object and instructs the distance measuring unit to measure a distance to the object for each position.

Figure 2:
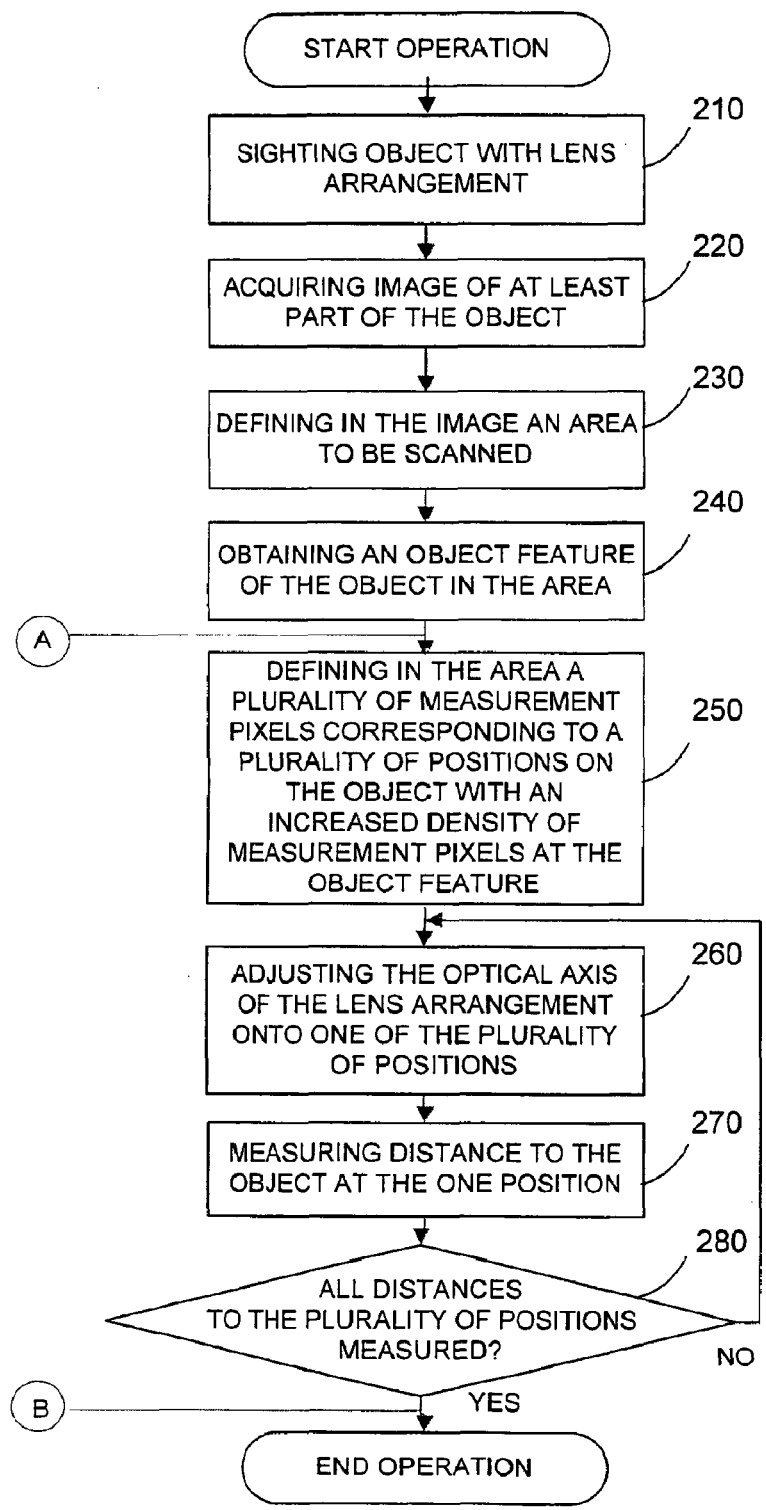
FIG. 2 illustrates operations of a method for obtaining distance and image information according to an embodiment of the invention.

In the following, operations of the optical instrument will be described with regard to FIG. 2. FIG. 2 illustrates a flow diagram of operations of a method for obtaining distance and image information, such as during operation of the optical instrument shown in FIG. 1.

The optical instrument may be constituted by a video surveying instrument, such as a video theodolite or video tachometer, also known as a tachymeter or total station or any other kind of optical instrument used for determining a position of an object and acquiring an image of the object. The optical instrument preferably is set up on the basis of calibration measurements on individual positions on a preferably known object conducted beforehand as described later or as obtained by any other calibration technique.

In a first operation 210, when starting operations, an object is sighted with a lens arrangement, e.g. the lens arrangement 110. Sighting the object with the lens arrangement 110 preferably includes adjusting the optical axis of the lens arrangement relative to at least one reference axis of the optical instrument so that the optical axis of the lens arrangement points in the direction of the object. In other words, where appropriate, the actual viewing direction constituted by the optical axis is aligned with the object.

In a subsequent operation 220, an image is acquired of at least part of the object with the camera 120 aligned with the optical axis of the lens arrangement 110. The acquisition may be triggered automatically, for example, after a certain time has elapsed, or may be triggered by an operator. It is pointed out that depending on the size and the distance of the object, the field of view of the camera may not be sufficient to acquire the whole object which may be a building, two buildings or a block or even parts of a city. In certain applications, it may thus be necessary to acquire several images, to be described later and referred to as sub images, to compose an image of the whole object.

In an operation 230, after sighting the object and acquiring an image of at least part of the object according to operations 210 and 220, an area of interest to be scanned is defined in the acquired image. For example, the area to be scanned is defined manually or by processing the image using a detection algorithm for detecting the object or the at least part of the object. This may be realized by any suitable imaging processing algorithm applied to the pixel data making up the image.

For example, considering a landscape with a building in the center, the detection algorithm may differentiate the building from the surrounding regions, such as fields and trees, and thus may define a building as the area of interest, namely as the area to be scanned.

Alternatively, it is also feasible to display the image on any suitable display unit and leave the decision about the area to be scanned up to an operator, who may click, for example, with a computer mouse or other pointing device, on pixels of the image to define the area to be scanned. Further, it may be preferable to display the image on a touch display unit, wherein the pixels only have to be touched by the operator for indicating the area to be scanned.

In an operation 240, an object feature of the object in the area is obtained, i.e. the area being part of the whole acquired image is analysed or processed in more detail to obtain smaller distinct features of the object shown in the area. Such an object feature may be obtained by processing the area in the image using a detection algorithm for detecting the object feature, such as a corner or a window of a building or a crack in a building wall.

A detection algorithm may be any suitable image processing algorithm known in the prior art to detect edges or other discontinuous variations in an object. Alternatively, as described above, it is also feasible that an operator may highlight object features directly in a displayed image by clicking on certain pixels in the image with a computer mouse or by touching a touch sensitive display unit with a finger or pen.

In an operation 250, a plurality of measurement pixels corresponding to a plurality of positions on the object, are defined in the area, wherein an increased density of measurement pixels is defined at the object feature.

In detail, once the area to be scanned is defined and the object feature is obtained, the first control element 152 defines in the area a plurality of measurement pixels. For example, an operator may preset the first control element 152 to define every tenth pixel of the area as a measurement pixel so that measurement data will later be obtained for each position on the object corresponding to the defined measurement pixel. The amount of measurement pixels and the spacing between two measurement pixels may depend on a desired grid density and required accuracy.

It has to be noted that the denser the grid and the higher the accuracy, the longer the required scanning time. Therefore, it is also feasible to set a scanning time and compute the maximum possible grid density and accuracy for the preset time. Similarly, since variations at the object are larger at distinct object features, it is preferable to increase the density of measurement pixels at such object features. For example, at a detected object feature, every second pixel of the area may be defined as a measurement pixel so that a resolution five times higher than in the rest of the area may be obtained. The same considerations as described above with respect to grid density, accuracy and scanning time, also apply for the measurement pixels at the object feature. Alternatively, it may also be possible that the operator defines individual pixels to be measurement pixels, which however may be cumbersome and very time consuming.

In an operation 260, the optical axis of the lens arrangement is sequentially adjusted on the plurality of positions, i.e. the second control element 154 instructs the positioning unit to adjust the optical axis of the lens arrangement so that the optical axis points sequentially to the positions to be measured on the object. Thereby, coordinates of the positions are provided with respect to each corresponding measurement pixel so that the positioning unit is enabled to move the lens arrangement and especially also the distance measuring unit to a new location to point at the position.

Here, it is noted that the coordinates may only constitute coordinates regarding the direction of the position to be measured, e.g. a horizontal and vertical angle, which is easily-derivable form the location of the pixel in the image as will be described later.

Finally, in operation 270, distances to the object at the plurality of positions are measured.

In detail, in the example shown in FIG. 2, at first, the optical axis is adjusted to a first position (operation 260) and the distance to this first position is measured (operation 270) and then the optical axis is adjusted to a second position (operation 260) and the distance to this second position is measured (operation 270) until all distances to the plurality of positions are measured, as indicated by operation 280.

For the measurement, a pulse method may be used, in which the propagation time of a signal, e.g. an optical pulse, is measured, which is directly proportional to the distance, since the speed of light and the refractive index of the medium, e.g. air, is known. Alternatively, a method known as the phase method may be used, comparing the phase of a transmitted wave from the instrument and the phase of a back reflected wave. However, since the distance is usually larger than the wavelength, the result is ambiguous, which may be solved by several transmission frequencies like in heterodyne phase detection.

Therefore, the distances to the object at the plurality of positions are measured with high accuracy by adjusting the optical axis of the lens arrangement anew for each distance measurement and measuring the distance for each position individually with a coherent light emitting device, such as a laser, using one of the above described methods.

It is noted that the embodiment is not limited to the above described time sequence of operations but that other time sequences of the operations may be devised, leading to the same result.

In the following with regard to FIGS. 3 and 4 examples of the previously described operations are described in more detail.

Figure 3:
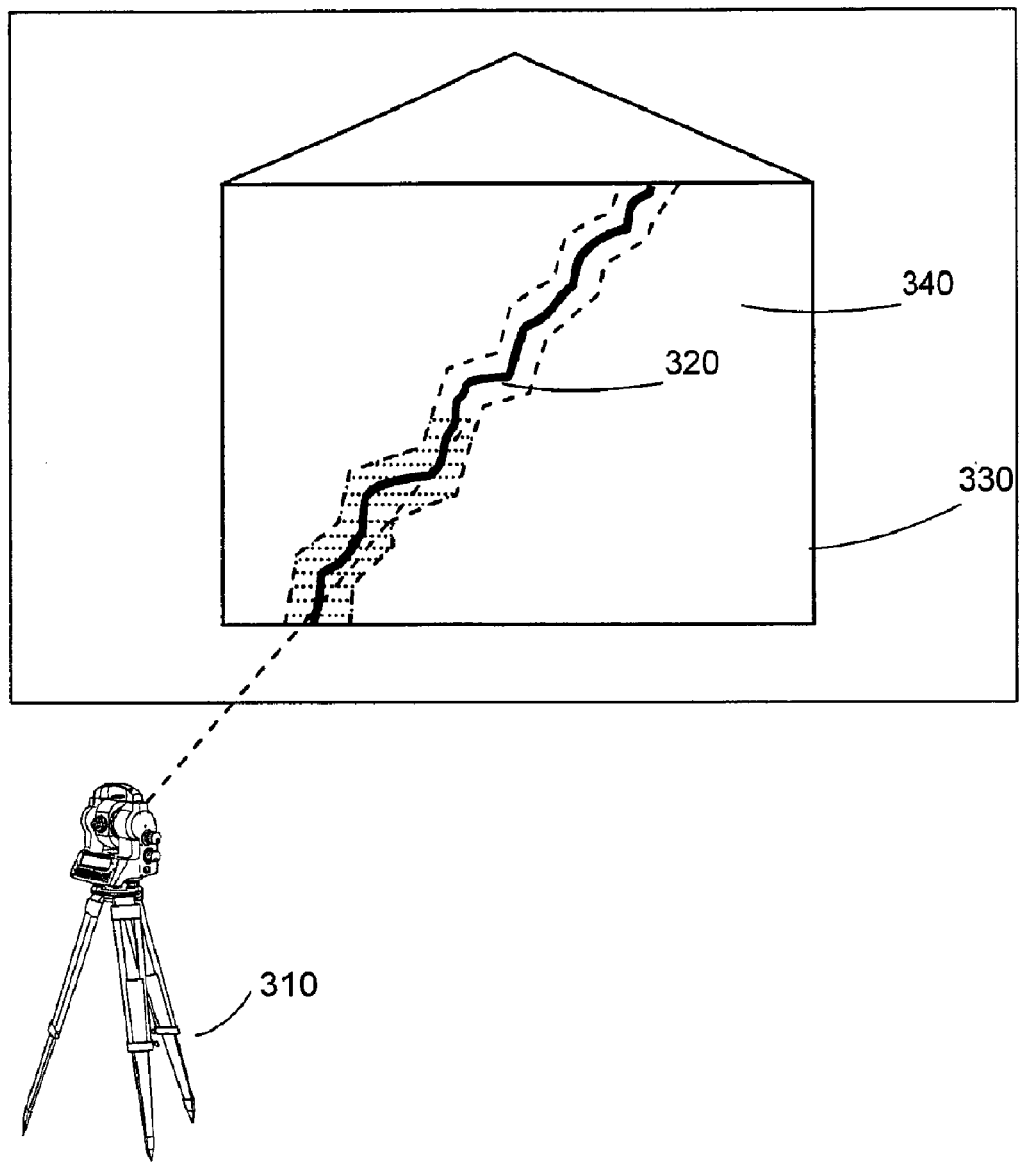
FIG. 3 illustrates an image of a building with a crack for explaining the operations of the method shown in FIG. 2.

FIG. 3 particularly illustrates a situation where a distinct object feature is present and the operations described above may be performed.

In detail, FIG. 3 illustrates an image of a building 330, in which crack or other disruption 320 in the wall of the building 330 is investigated. The image of the building may be acquired by the optical instrument shown in FIG. 1. Here, the optical instrument 310 is only shown for illustrative purposes to explain the scanning procedure, and it should be understood that the optical instrument does not physically scan the area within the image but the three dimensional scene comprising the object in reality. The image is shown on a display of the optical instrument, which is preferably removable from the instrument to be carried around.

The image shown in FIG. 3 comprises multiple pixels and for illustrative purposes a small amount of measurement pixels is shown as dots along the crack 320 between the dashed lines. For example, the area to be scanned may be defined as the building 330 or the wall 340 and the object feature is the crack on the wall 340.

No measurement pixels are shown on the wall 340, except in the vicinity of the crack but it is clear from the description above that also measurement pixels might be defined on the wall, however, since there are no further alterations or variations on the wall, except the crack, the density of measurement pixels on the wall may be much smaller than along the crack. The crack 320 constituting, for example, the object feature may be measured in much more detail with an increased density of measurement pixels scanned in vertical lines from the bottom to the top.

As described above, the area to be scanned, e.g. the building 330 or the wall 340, may be defined by the operator or by a detection algorithm detecting the building 330 or the wall 340 in the image. Once the area is selected, a more detailed analysis of the area may be performed, wherein the object feature, e.g. the crack 320, is obtained by an operator or a detection algorithm detecting irregularities on the wall 340.

Figure 4:
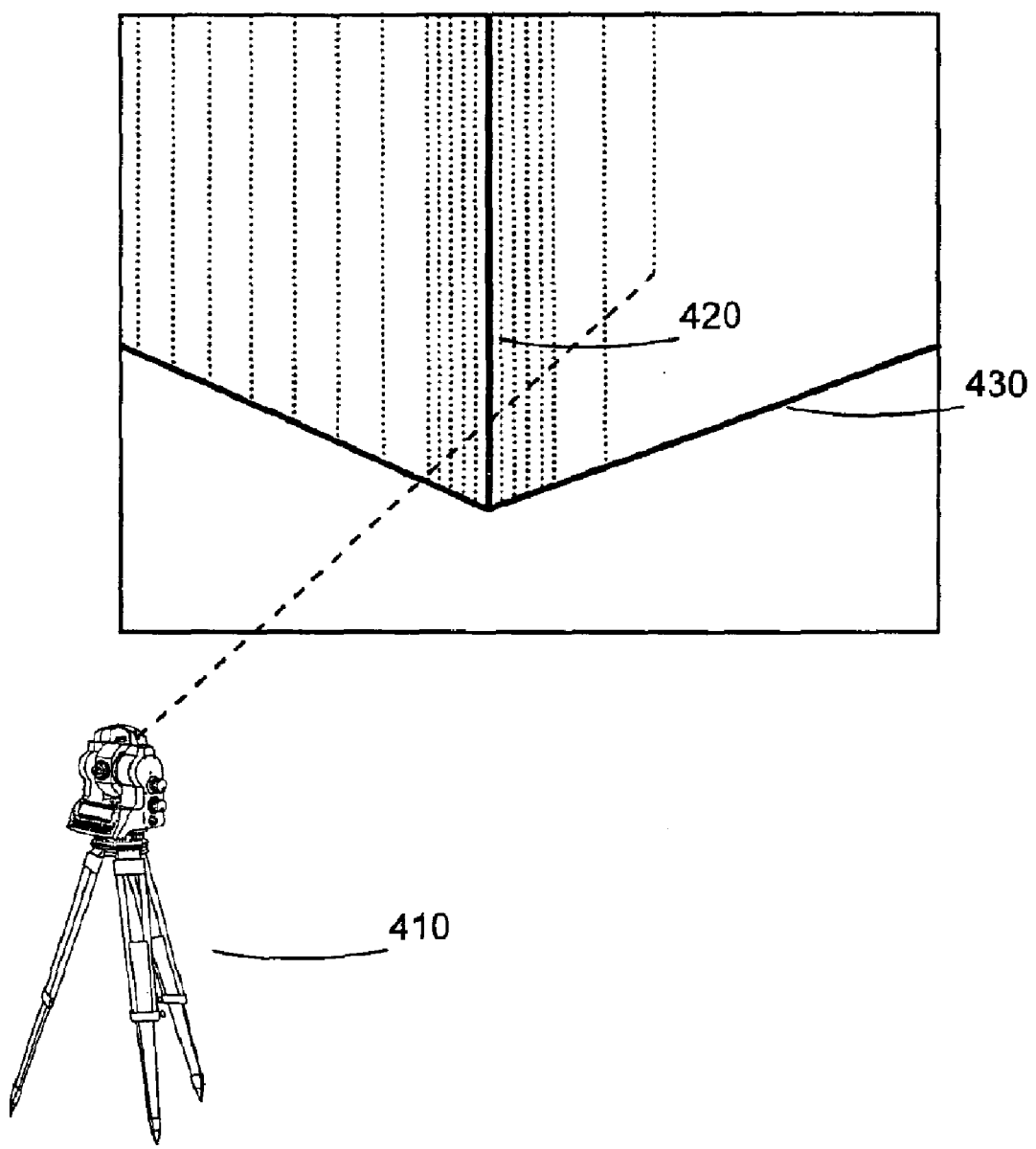
FIG. 4 illustrates an image of a corner of a building for explaining the operations of the method of FIG. 2 in more detail.

FIG. 4, particularly illustrates a situation for scanning a feature of interest of a building or other object. FIG. 4 illustrates an image of a part of the object, e.g. a corner 420 of a building 430, wherein the area to be scanned is defined as the side walls of the building 430, which may be defined by an operator or by a detection algorithm as described above. The optical instrument 410 is shown only for illustrative purposes, since in FIG. 4 an image is again shown and not the real building.

In this example, the corner 420 of the building 430 may constitute the object feature and may be obtained by either an operator operating the optical instrument or by a detection algorithm detecting variations in the area as described above. Therefore, as explained in operation 250, a plurality of measurement pixels corresponding to a plurality of positions on the object in reality are defined, and the density of measurement pixels is increased at the corner 420, i.e. the vertical scan shown in FIG. 4 shows an increased density of scan lines around the corner 420, since this constitutes a discontinuous variation in the area to be scanned, which has to analysed in more detail.

After the definition of the measurement pixels in the image, the optical instrument may then start to measure the actual distances to the object at the plurality of positions corresponding to the plurality of measurement pixels. Thereby, the optical axis of the lens arrangement is sequentially adjusted onto the plurality of positions. For example, starting at the upper left measurement pixels in the left corner, the positioning unit 140 moves the acquisition unit to the coordinates of the position corresponding to the upper left measurement pixel and a measurement is taken. Subsequently, the positioning unit changes the position to the position corresponding to the measurement pixel one below the upper left measurement pixel and so on.

Figure 5:
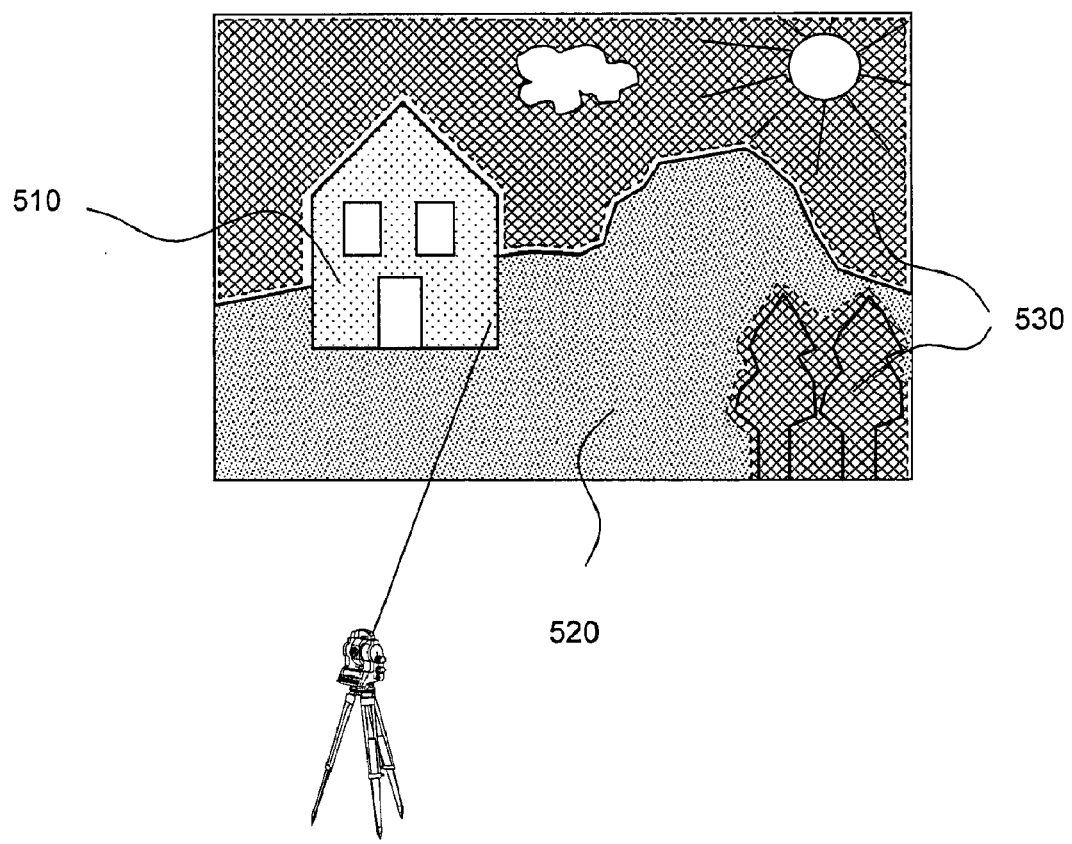
FIG. 5 illustrates an image of a landscape for explaining operations of a method according to another embodiment of the invention.

FIG. 5 particularly illustrates multiple regions forming the area of interest. Here, an image is shown with several regions 510, 520 and 530.

In this example, the area to be scanned is defined by the regions 510 and 520, being regions with low measurement pixel density and high measurement pixel density, respectively. The regions may be assigned according to the importance, resolution requirements and accuracy requirements, opening up the possibility to spend different scanning times within different regions. The regions may be assigned to a region with a low measurement pixel density for regions with small variations in structure, regions with a high measurement pixel density for regions with larger variations in structure and regions without measurement pixels for regions that are not of interest, for example, the sky and the trees in FIG. 5.

The definition of the separate regions may be performed by an operator viewing the image or by an algorithm performing image analysis including contrast, colour, pattern and edge detection. The analysis will detect areas of similar properties and combine them into regions. The obtained regions may then be categorized automatically by the algorithm or by the operator by their properties or importance.

The algorithms for categorization could have different profiles for different applications, e.g. tunnel, architecture, forensic, etc. Further, regions may be defined, which have to be analyzed in more detail, for example to detect an object feature, such as a crack (not shown) in the wall of the building 510, in a way similar as described above. After selection and analysis of the regions, a first rough scan may be performed using only, e.g. a tenths of the measurement pixel defined in the area to measure a distance to the corresponding positions to estimate a scanning time of the area to be scanned so that the operator may decide to scan the area with the regions previously selected or reselect different measurement pixel densities for the regions to speed up scanning It may be advantageous to use as a rough scan, a pre scan as will be described below.

Therefore, the scanning time may be reduced leading to reduced power consumption and reduced need for service and calibration of the optical instrument.

Figure 6:
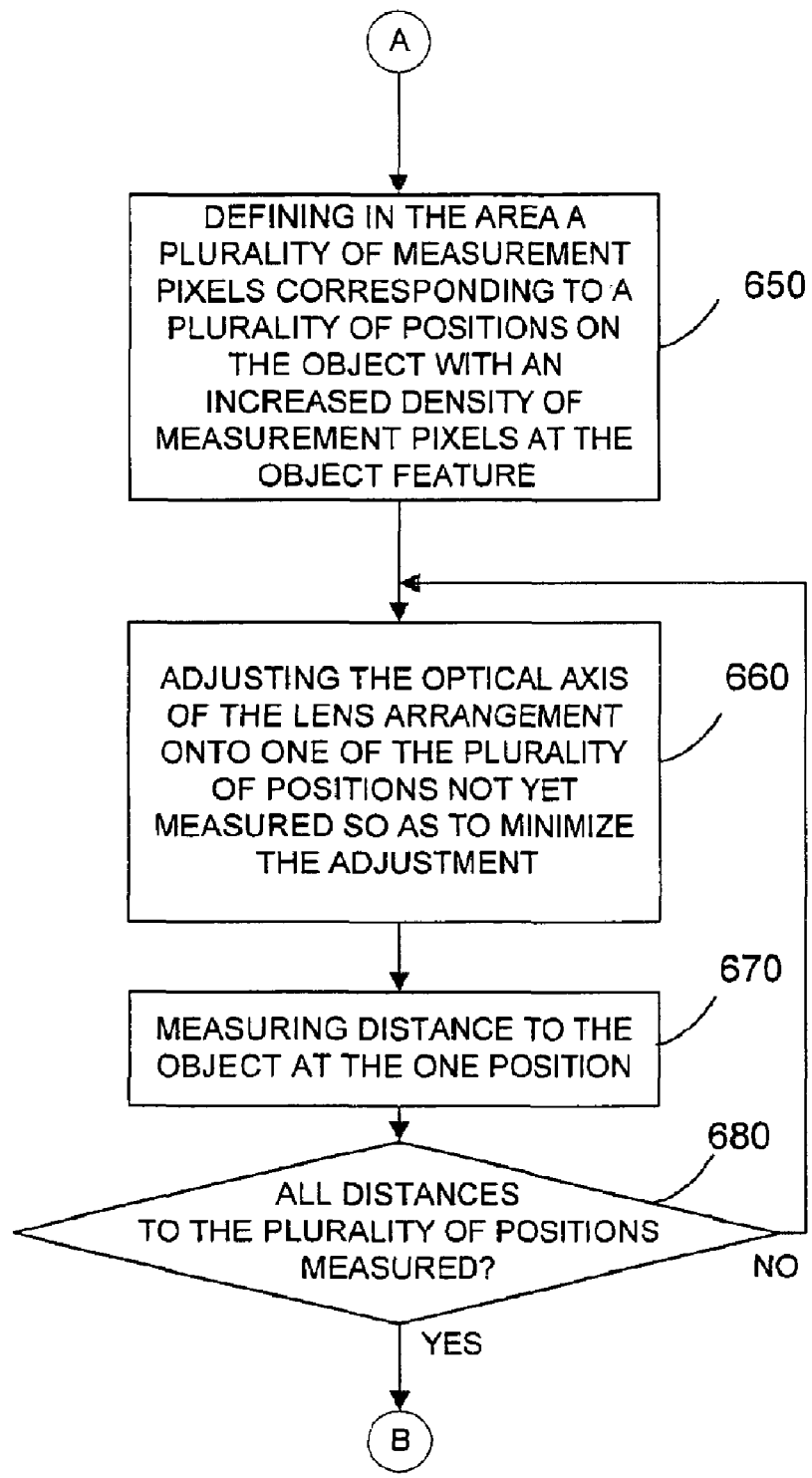
FIG. 6 illustrates operations of a modification of the method shown in FIG. 2.

In the following a further embodiment will be described with regard to FIG. 6, particularly illustrating a scan procedure. FIG. 6 describes a modification of the method previously discussed with respect to FIG. 2. In this method of FIG. 6, the operations 210 to 240 are the same as previously discussed with respect to FIG. 2. Further, the operation 650 shown in FIG. 6 is the same as the operation 250 described with respect to FIG. 2 and is thus not explained in further detail to avoid unnecessary repetition.

In an operation 660, the optical axis of the lens arrangement is again sequentially adjusted onto the plurality of positions on the object but now the adjustment is performed so as to minimize the movement of the positioning unit when scanning the measurement pixels. Then, in operation 670 the distances to the object at the plurality of positions are measured.

In detail, as described with respect to FIG. 2, at first, the optical axis is adjusted to a first position (operation 660) requiring the smallest adjustment of the lens arrangement and the distance to this first position is measured (operation 670) and then the optical axis is adjusted to a second position requiring the smallest adjustment with respect to the first position (operation 660) and the distance to this second position is measured (operation 670). The operations 660 and 670 are repeated until all distances to the plurality of positions are measured, as indicated by operation 680.

The operations of FIG. 6 are described as applied to the previous examples.

FIGS. 3 and 4 illustrate a horizontal and a vertical scan, respectively, but there are certain cases, in which scanning of the measurement pixels and respectively adjusting the optical axis on the corresponding positions to be measured differently can be more appropriate, for example, when a different scan strategy leads to a faster scan.

For example, assuming a ring-shaped object, it may be time consuming to scan the object by a vertical or horizontal line scan, since the measurement pixels of interest do not form a line or straight geometry, and therefore, when finishing the measurements of positions corresponding to measurement pixels on the one side of the object, the optical axis has to be adjusted by a large angle to measure the corresponding part of the ring-shaped object on the other side, for example, the right side when starting on the left side in a horizontal scan.

Therefore, it may be preferable to take distance measurements along the circumference of the ring-shaped object so that the optical axis is adjusted one by one along the circumference of the ring-shaped object, minimizing the necessary adjustment from one measurement to the next measurement.

In certain applications, it might be useful to define in the area to be scanned a plurality of measurement pixels along a predetermined profile. Such a case will be discussed with respect to FIG. 7.

Figure 7:
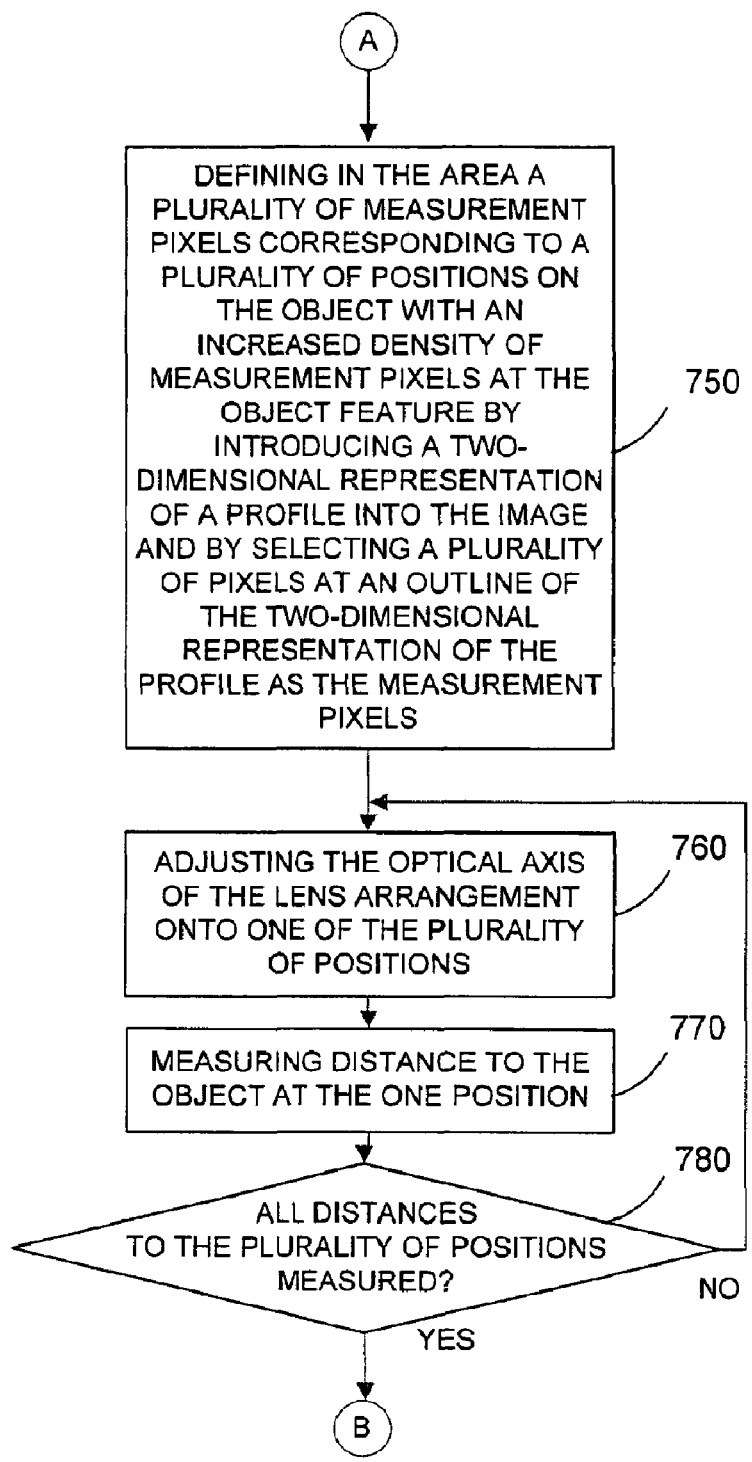
FIG. 7 illustrates operations of a modification of the method shown in FIG. 2.

In the following a further embodiment of the invention will be described with regard to FIGS. 7 and 8, particularly illustrating introducing projecting an e.g. 3D profile into the image in the process of defining measurement pixels. FIG. 7 shows another modification of the method discussed with respect to FIG. 2. The first four operations in FIG. 7 may be the same as the operations 210 to 240 discussed with respect to FIG. 2 and thus are not further discussed to avoid repetitions.

In an operation 750, a plurality of measurement pixels corresponding to a plurality of positions on the object, with an increased density of measurement pixels at the object feature, is defined by introducing a two-dimensional representation of a profile into the image and by selecting a plurality of pixels at an outline of the two-dimensional representation of the profile as the measurement pixels. The operations 770 and 780 correspond to the operations 270 and 280.

In other words, in this embodiment, the measurement pixels are defined by a predetermined profile or shape, such as two-dimensional geometries like a square, a triangle, a circle or any kind of polygon, as well as three-dimensional geometries like a cylinder, a cube, a cuboid, a sphere or also parts of these geometries.

Specifically, in the case of a three-dimensional profile, the two-dimensional representation of that profile is introduced into the image, i.e. the two-dimensional representation is overlaid or superimposed on the image and a plurality of pixels at the outline of the two-dimensional representation of the profile is selected and defined as the measurement pixels, for which distances to corresponding positions have to be measured.

For example, such a way of defining the measurement pixels may be useful in applications, in which the object on which positions have to be measured has a certain shape similar to the profile. An example may be the application of the optical instrument to measure positions in a tunnel. Thereby, it is advantageous to project the two-dimensional representation of the profile of a cylinder into the image and instead of using X, Y, and Z directions, it may be more appropriate to measure distances to positions in a cylinder coordinate system, since such a cylinder coordinate system is closer to the actual shape of the object.

Here, it may be mentioned that a position on an object may be defined by Cartesian coordinates defined with respect to a Cartesian coordinate system having three axes orthogonal to each other. For measuring positions, spherical coordinates, however, may be more appropriate in some cases.

The position of an object may accordingly be defined in spherical coordinates by its distance to an origin of an orthogonal coordinate system, an angle (horizontal angle) between one of the horizontal axes of the coordinate system and a line connecting the origin of the coordinate system with a projection of the position onto the horizontal plane and finally a vertical angle between the coordinate system axis orthogonal to the horizontal plane and a line connecting the origin of the coordinate system and the position. Cartesian coordinates can be transformed into spherical coordinates and vice versa. Usually, the origin of the coordinate system is placed in the optical instrument optimally also coinciding with the projection center of the camera, as will be discussed later.

The positioning unit may be adapted to measure horizontal and vertical angles to the plurality of positions on the object with respect to a reference axis system, such as the Cartesian coordinate system with the origin placed in the optical instrument.

Figure 8:
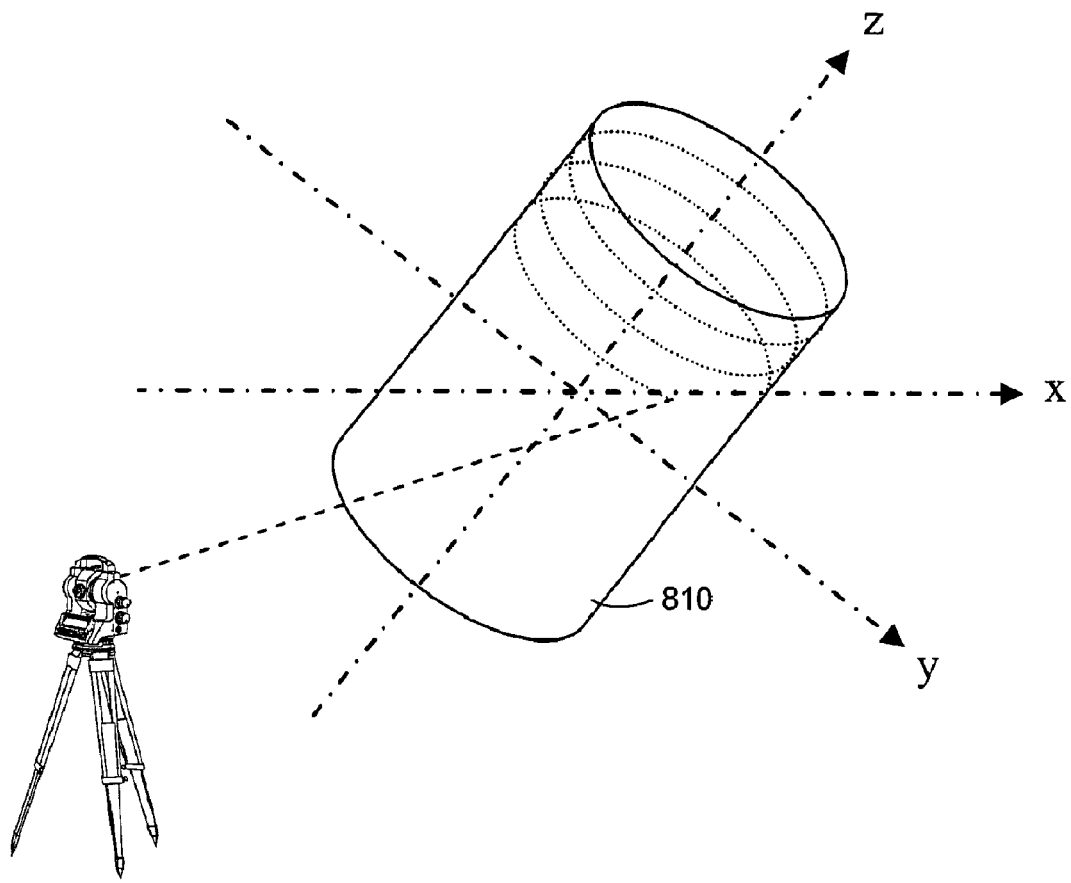
FIG. 8 illustrates a cylinder to be scanned for explaining the operations of a method according to another embodiment of the invention.

However, as described in FIG. 8, it is also possible to place the origin of the coordinate system in the object to obtain an object coordinate system, which is given in the example of FIG. 8 by the cylinder coordinate system. Then, the optical instrument may scan profiles of a cylinder 810 in the cylinder coordinate system, which in case of measurements performed in a tunnel, may be more appropriate.

In the following a further embodiment will be described with regard to FIGS. 9 and 10, particularly illustrating several sub images for framing an area of interest. Specifically, it will be explained that measurements may also be taken of positions which are not shown on any sub image.

Figure 9:
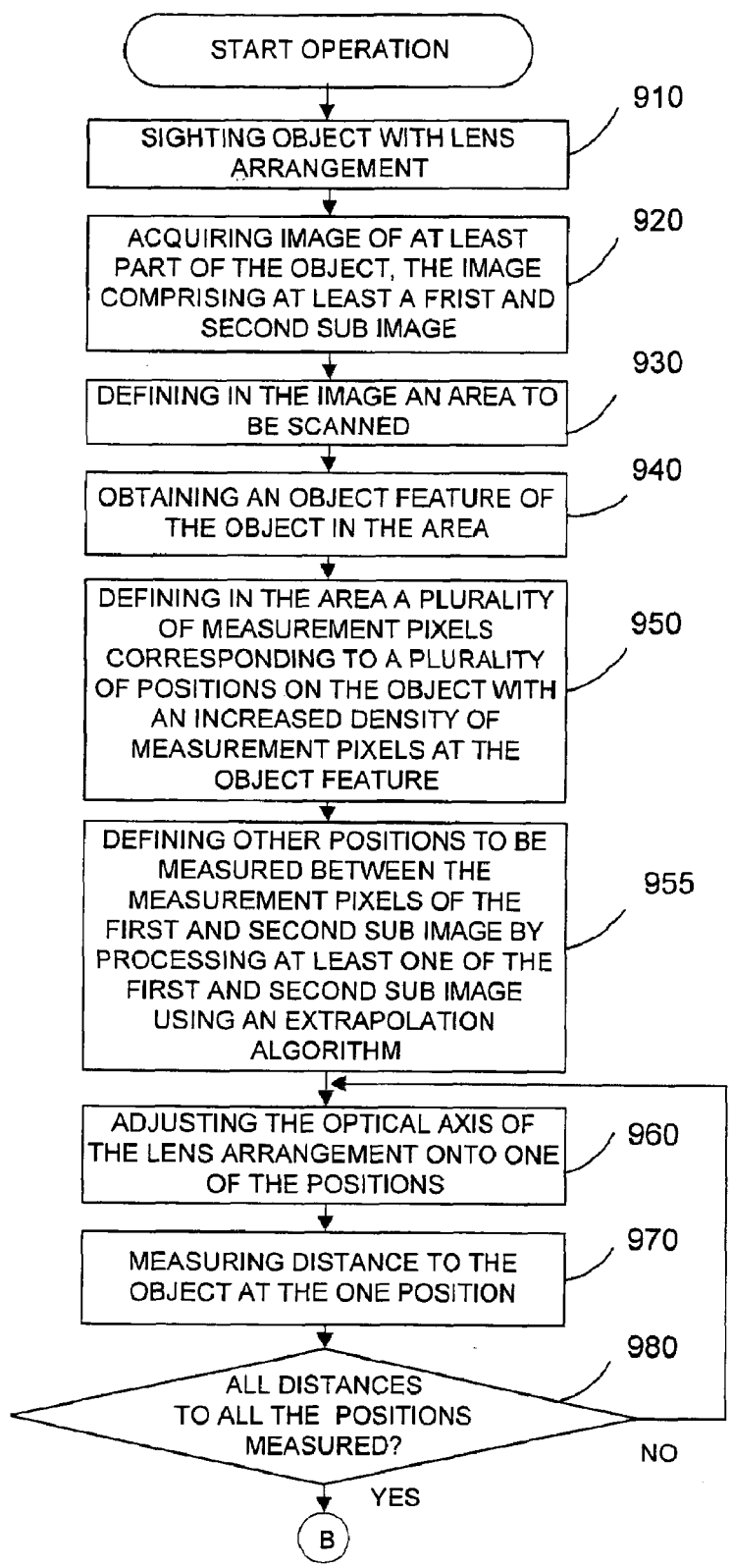
FIG. 9 illustrates operations of a modification of the method shown in FIG. 2.

FIG. 9 shows a method for obtaining distance and image information of an object according to another embodiment of the invention. Operation 910 in FIG. 9 may be identical to operation 210 in FIG. 2, wherein an object is sighted with a lens arrangement, such as the lens arrangement 110 of the optical instrument shown in FIG. 1.

In an operation 920, an image of at least part of the object is acquired, wherein the image comprises at least a first and a second sub image.

In other words, if the image which has to be acquired, is larger than the field of view of the camera of the optical instrument, for example, if the object is very close or very large, at least two sub images are acquired by the camera by moving the field of view of the camera from the position corresponding to a first sub image to a second position corresponding to a second sub image and sequentially acquiring the sub images with the camera. This procedure is also illustrated in FIG. 10 showing an elongated cuboid and six sub images, wherein, for example, a first sub image 1010 is taken at a first position 1015 on an edge of the elongated cuboid or block and a second sub image 1020 is acquired at a different position 1025 at another corner of the elongated cuboid above the first one.

Referring back to FIG. 9, in an operation 930, an area to be scanned is defined in the image, similarly to operation 230 shown in FIG. 2. However, in the example shown in FIG. 10, the area to be scanned is comprised of at least one of a part of the first and second sub image 1010 and 1020, respectively, and e.g. further sub images 1030, 1040, 1050 and 1060.

In an operation 940, an object feature of the object in the area is obtained. Such an object feature may be defined by the operator or by a detection algorithm, as previously described, in at least one of the first and second sub image, and may be represented in FIG. 10 by the lower left corner of the surface 1080 of the elongated cuboid acquired in the first sub image 1010. The object feature in sub image 1010 is presented in the sub image by a dashed line.

In an operation 950, a plurality of measurement pixels corresponding to a plurality of positions on the object is defined in the area with an increased density of measurement pixels at the object feature. In the example of FIG. 10, referring only to the first and second sub image 1010 and 1020, respectively, this means that the two sub images comprise the plurality of measurement pixels. These measurement pixels correspond to positions on the object on the dashed line as far as the dashed line is shown in the first or second sub image.

In an operation 955, other positions to be measured between the measurement pixels of the first and second sub image are defined by processing at least one of the first and second sub images using an extrapolation algorithm. This operation takes into account that there may be parts of the object which are not shown on one of the sub images but the interesting features of these parts may be easily derivable from the information given in the acquired sub images.

Figure 10:
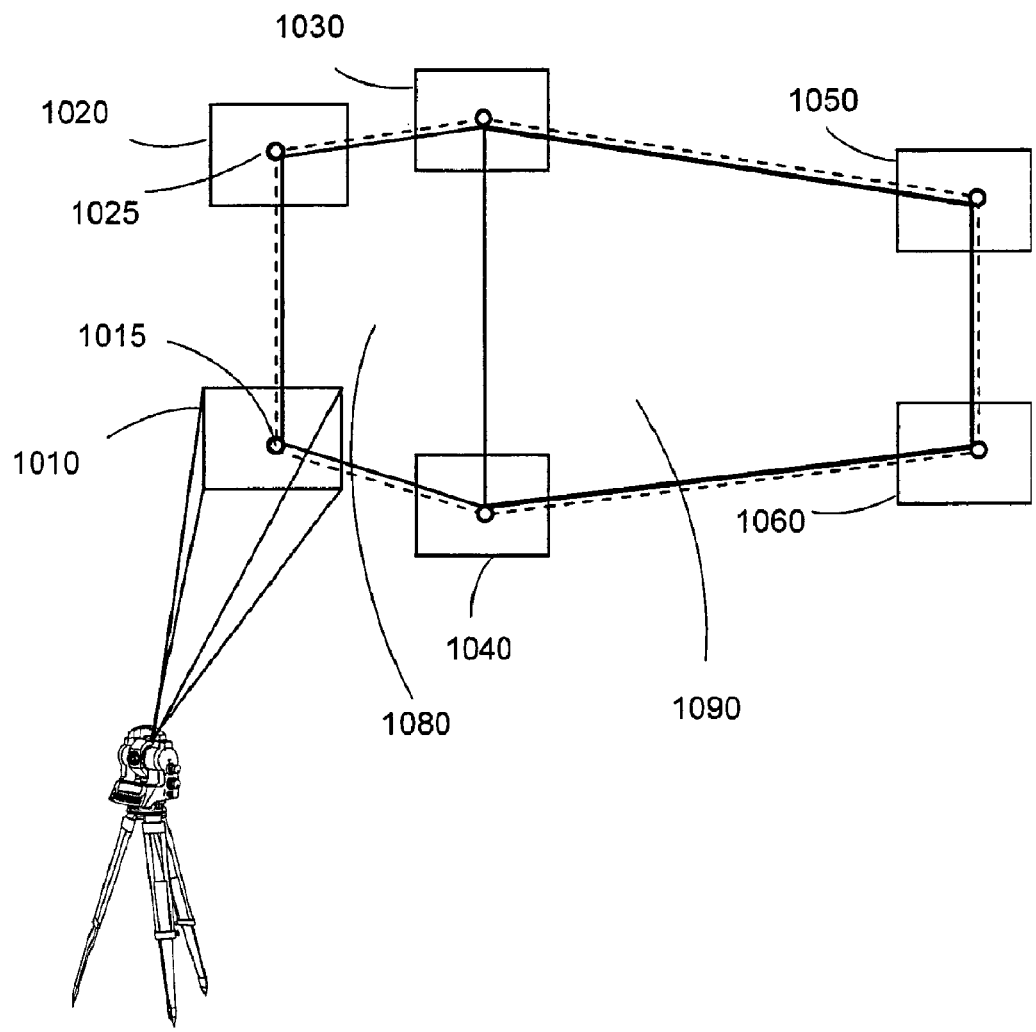
FIG. 10 illustrates a structure with sub images superimposed for explaining the method shown in FIG. 9.

Referring again to the example shown in FIG. 10, viewing the first and second sub image, it may easily be recognized that the lower part of the left edge of the surface 1080 continues to extend in a vertical direction and in the second sub image 1020 it may easily be recognized that the upper part of the left edge of the surface 1080 extends downwardly joining the lower left edge of the first sub image 1010.

Therefore, by processing the two sub images, it is easily possible to define other positions along a line connecting the object features shown in the two sub images or by using an extrapolation algorithm for extrapolating the lower left edge up to the upper left edge of the surface 1080, when detecting the object feature by a detection algorithm or by an operator selecting the object feature.

Consequently, also positions may be measured corresponding to measurement pixels of an imaginary sub image placed between the first and second sub image.

Finally, in operations 960 and 970, the optical axis of the lens arrangement is again sequentially adjusted onto the positions to be measured and as in operation 270 the distances to the object at the positions are measured for all distances to all positions, as indicated by operation 980.

FIG. 9 has been explained with respect to the example shown in FIG. 10 but limited to only two sub images. As shown in FIG. 10, a much more complicated operation may be considered. For example, four sub images 1010, 1020, 1030, 1040 of all four corners of the surface 1080 may be acquired and positions between the sub images may be measured.

It may be noted that the six sub images shown in FIG. 10 and the dashed line may represent the extent of an area to be scanned, namely a polygon framed by the six corners indicated by the six small circles in the six sub images 1010, 1020, 1030, 1040, 1050 and 1060.

Finally, it may be noted that also the edge defined by the surfaces 1080 and 1090 may be measured similarly, although no dashed line is present. That is, the edge may be detected by a detection algorithm or selected by an operator as an object feature so that an increased amount of measurement pixels is defined along the edge and a smaller amount is defined in the polygon-shaped area framed by the sub images. Additionally, a plurality of measurement pixels may be defined in the area, namely on the surfaces 1080 and 1090 or a simple line scan with predetermined step size may be performed.

FIG. 10 may also be used to explain another embodiment of the invention. This embodiment may be referred to as a calibration or pre-scan procedure, in which selected positions are measured with high accuracy.

Here, it will be assumed that the positions on the object in FIG. 10 corresponding to the two small circles 1015 and 1025 in sub image 1010 and sub image 1020, respectively, constitute core point pixels, i.e. measurement pixels corresponding to core positions of the object, for which a precise distance measurement should be obtained. For example, these positions are positions at the edges or other discontinuous variations in the area or of the object.

These core point pixels of the image are converted into an approximation of coordinates of core positions to be measured assuming a default distance to the core positions, wherein the conversion will be described in more detail below.

In the next operation, the optical axis of the lens arrangement is adjusted onto the core positions to be measured by the positioning unit 140 and the distances to the selected core positions are measured, as described above.

Finally, the coordinates of the core positions are recalculated based on the measured distances, namely the core point pixels are again converted into coordinates of core positions, however, the conversion is now based on the measured distance and not a default distance so that an even more accurate result of the position, in terms of horizontal and vertical angles and distance, may be achieved. This pre-scan procedure will be described in more detail below with respect to FIGS. 11 and 12A to 12C.

It should be noted that the method described above is not limited to core point pixels, actually each measurement pixel may constitute a core point pixel, if a highly accurate result should be obtained. However, it has been shown that it is often enough to calculate only some positions very accurately to more or less set the range, in which variations might be expected.

In the following, the conversion operation of converting measurement pixels in the image to coordinates of real positions on the object will be described in detail.

In an ideal optical instrument with a camera and a distance measuring unit, the projection center of a camera is identical with the intersection point of all three axes of the optical instrument and the distance measurement is taken from the intersection point along a direction orthogonal to the image plane. Then, the center of the image plane, e.g. a pixel, is the exact image of the position hit by laser light of the distance measuring unit. Ideally, it is thus possible to assign to each position in real space around the optical instrument, a pixel in the image plane.

Since the camera is rotatable about a vertical axis for panning fixed with respect to the base of the instrument, for example a tripod or other support, and is rotatable about a tilting axis, images may be taken of a sphere around the instrument. For example, panoramic images may be taken by stitching together single images.

Further, the optical axis of an ideal camera should be perpendicular to the image plane and should coincide with the optical axis of an optical system, such as the lens arrangement 110, and the optical system should be free of aberrations or distortions.

However, the above only constitutes an idealization of an optical instrument with an ideal camera and such ideal conditions should not be assumed. Therefore, there is a need for improved mapping between positions in space and corresponding pixels in the image and the camera has to be calibrated with respect to the axis system of the optical instrument with a known interior camera orientation. For example, such a method for calibration is described in DE 103 59 415 A1 or WO 2005/059473 A2, where the interior and exterior orientation of a camera in an optical instrument have been precisely defined.

It is noted that the error of the offset between the projection center of the camera and the origin of the optical instrument, i.e. the intersection point of the three axes of the optical instrument, is related to the distance to the object, more precise coordinates of a position on the object may be obtained, the better the information about the distance to the position. Further, as described above, there may be also an offset between the measurement axis and the optical axis. However, this offset is roughly known and may only be considered significant at close range.

Figure 11:
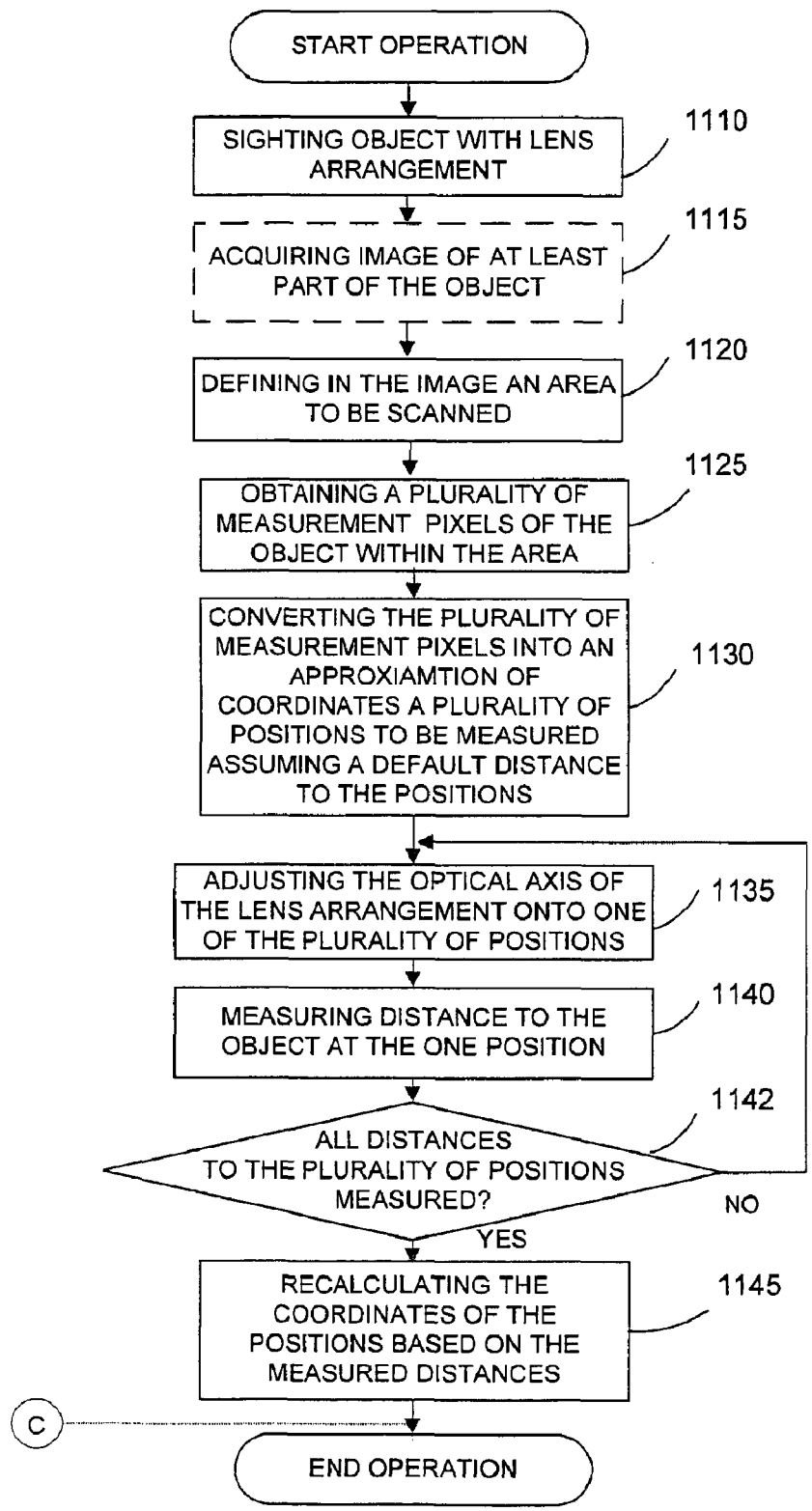
FIG. 11 illustrates operations of a method for obtaining accurate distance and image information according to an embodiment of the invention, particularly illustrating pre-scan operations.

While the operations and device features as outlined with regard to the previous embodiments are suited to provide acceptable results for many applications, e.g. by transforming the image coordinates of a measurement pixel into a measurement position in space by means of a fixed conversion operation or conversion function assuming a default distance of the object to the camera, in order to improve the accuracy of the measurements, the above noted offsets or errors may be taken into account and compensated for, as it will be outlined in the following with regard to FIG. 11 and further figures below.

To compensate for the above offsets, conversion algorithms may be used, such as algorithms or conversion functions. Alternatively, conversion tables may be defined to look up a specific position corresponding to a pixel in the image, wherein different tables may be defined for different distances from the instrument to the object to be measured.

In an example distance and image information of an object can be obtained by first sighting the object with a lens arrangement, then acquiring an image of at least part of the object with a camera aligned with the optical axis of the lens arrangement, defining in the image an area to be scanned, obtaining a plurality of measurement pixels of the object within the area, converting the plurality of measurement pixels into an approximation of coordinates of a plurality of positions to be measured assuming a default distance to the plurality of positions, adjusting the optical axis of the lens arrangement sequentially onto the plurality of positions to be measured, measuring the distances to the plurality of positions, and recalculating the coordinates of the plurality of positions based on the measured distances.

Thus, by iteratively, in this example two times, determining the measurement position on the object, the accuracy of the conversion of the pixel into a measurement direction can be improved.

The method shown in FIG. 11 may be performed by the optical instrument as described in one of the previous embodiments.

In an example in accordance with FIG. 1 the optical instrument for obtaining distance and image information of an object comprises a lens arrangement 110 for sighting the object, a camera 120 aligned with the optical axis of the lens arrangement for acquiring an image of at least part of the object, a distance measuring unit 130 for measuring a distance to the object along a measurement axis of the distance measuring unit parallel to the optical axis of the lens arrangement, a positioning unit 140 for adjusting the optical axis of the lens arrangement relative to at least one reference axis, and a control unit 150 having a first control element 152 adapted to define in the image an area to be scanned, to obtain a plurality of measurement pixels of the object within the area and to convert the plurality of measurement pixels into an approximation of coordinates of a plurality of positions to be measured assuming a default distance between the plurality of positions and the optical instrument, and a second control element 154 adapted to instruct the positioning unit to adjust the optical axis of the lens arrangement sequentially onto the plurality of positions to be measured and to instruct the distance measuring unit to measure the distances to the plurality of positions, wherein the first control element is further adapted to recalculate the coordinates of the plurality of positions based on the measured distances.

In the following the operations of FIG. 11 will be outlined in detail, and subsequently an example of the operations will be given with respect to FIG. 12.

In an operation 1110, the object is sighted with a lens arrangement, for example the lens arrangement 110 of FIG. 1, by suitably adjusting the optical axis of the optical instrument. In an operation 1115, an image is acquired, showing at least part of the object. In an example the image is acquired by an operator entering a corresponding instruction to acquire a presently shown image, e.g. on a display of the instrument.

In an operation 1120, an area to be scanned is defined in the image. The area to be scanned may be defined by an operator viewing the image as previously described with respect to FIG. 2 or may be defined by a detection algorithm, which was also previously described with respect to FIG. 2.

In an operation 1125, a plurality of measurement pixels of the object within the area is obtained. For example, an operator viewing the image e.g. clicks on or otherwise selects a pixel in the image using a mouse or a pen, when a touch screen is used, to define the pixel as a measurement pixel.

The operations 1110 to 1125 may be the same as the operations 210 to 240 previously described with respect to FIG. 2, and therefore the description of these operations 210 to 240 is also applicable to the operations 1110 to 1125.

In an operation 1130, the plurality of measurement pixels is converted into an approximation of coordinates of a plurality of positions to be measured assuming a default distance to the plurality of positions. Namely, a conversion algorithm or conversion table, such as the lookup table described above, may be used to obtain for each measurement pixel coordinates of the corresponding position to be measured, while assuming a default distance to the position, since the conversion in a non-ideal situation is distance-dependent.

It should be mentioned that the deviation between the approximate coordinates of the position and the exact coordinates decreases with an increase in distance, since the impact of the above described offset between projection center and the origin of the optical instrument decreases. For example, a conversion may be performed with a starting value for the default distance being 50 meters. However, it is also possible that an operator enters a different value at the beginning of the procedure depending on the required application.

In an operation 1135, the optical axis of the lens arrangement is adjusted sequentially onto the positions to be measured. This may be done according to the previous embodiments by tilting and panning the acquisition unit 160 of the optical instrument 100 by the positioning unit 140 so that the optical axis of the lens arrangement 110 points to the position to be measured.

Further, as described above, since the optical axis of the lens arrangement and camera do usually not coincide with the measurement axis of the distance measuring unit, further adjustments may be performed, which may also be already integrated in the conversion, since the offset between the optical axis and the measurement axis are known and the distance is assumed.

In an operation 1140, the distances to the plurality of positions are measured. The measurements may be performed by laser range measurements previously described before or known in the art.

In detail, in operation 1135, the optical axis is first adjusted to a first position to be measured, whereupon the measurement is taken of the first position in operation 1140, and then this procedure is repeated as indicated by operation 1142, namely the optical axis is adjusted to a second position, whereupon the second measurement of the distance to the second position is measured and so on.

Finally, in an operation 1145, the coordinates of the plurality of positions are recalculated based on the measured distances, i.e. since after operation 1140, the distances to the plurality of positions are better known than in the previous assumption, these measured distances may be used in the conversion operation to obtain highly precise coordinates of the plurality of position.

It has to be noted that the embodiment may not be limited to the above described sequence and that other sequences of the operations may be more appropriate for certain other cases.

For example, it may be preferable to perform operation 1125 before operation 1120, e.g. when an area to be scanned is defined by an operator indicating a plurality of measurement pixels that form the corners of the area.

For example, four measurement pixels are selected by an operator or by a detection algorithm and a quadrangle obtained by connecting the four measurement pixels is used to define the area to be scanned. The method described with respect to FIG. 11 may be referred to as a pre-scan procedure to improve the accuracy of an actual scan of the object as may be described in more detail in FIGS. 12A to 12C.

Figure 12A:
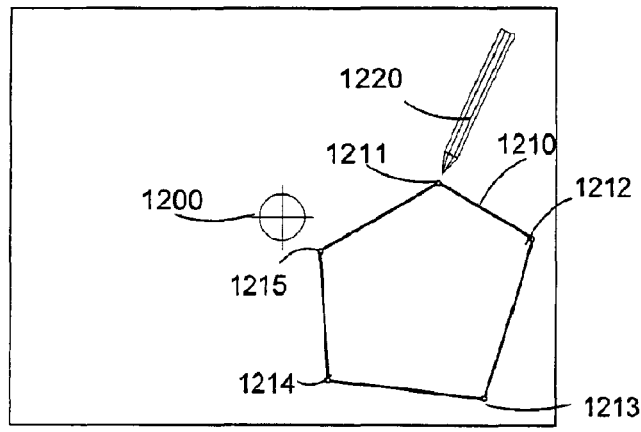
FIGS. 12A to 12C illustrate an image of a polygon for explaining the operations of the method shown in FIG. 11.

FIG. 12A illustrates a crosshair 1200 referring to the measurement axis of the optical instrument and a polygon 1210. The polygon 1210 represents the area to be scanned in the image and may be defined either by an image processing algorithm or by an operator using a pen 1220 on a touch screen or a computer mouse or track ball to indicate the polygon point positions 1211 to 1215. The real polygon point positions of the object corresponding to the measurement pixels defined in the image are approximately known due to the eccentric camera setup with respect to the measurement axis of the optical instrument.

Figure 12B:
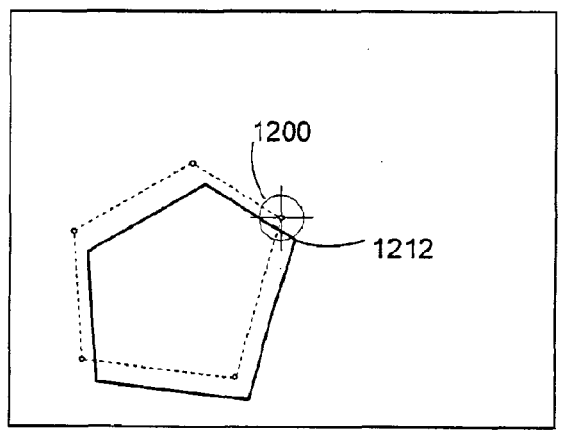

FIG. 12B illustrates the transformation of the defined measurement pixels into instrument directions using a default distance, e.g. the mean measurement range of the optical instrument. This transformation is preferable obtained by a conversion algorithm taking into account the distance to the object, such as the one referenced above. After adjusting the positioning unit to the coordinates obtained by the conversion, the measurement axis of the optical instrument points to the polygon point position 1212 and a distance measurement is taken.

As can be seen in FIG. 12B, the crosshair 1200, indicating the converted or calculated polygon point position 1212, does not fully overlap with the real polygon point position 1212 due to minor insufficiencies in the alignment of the elements in the optical instrument, which however may be removed by the above-referenced calibration method, if the distance to the object is known. Therefore, the distance measurement is taken.

Since the crosshair 1200 and the polygon point position 1212 are almost identical, the distance measured at the position of the crosshair 1200 may be basically the same as that measured at the polygon point position 1212 so that a good approximation of the distance is obtained and the coordinates of the polygon point position may be recalculated.

Figure 12C:
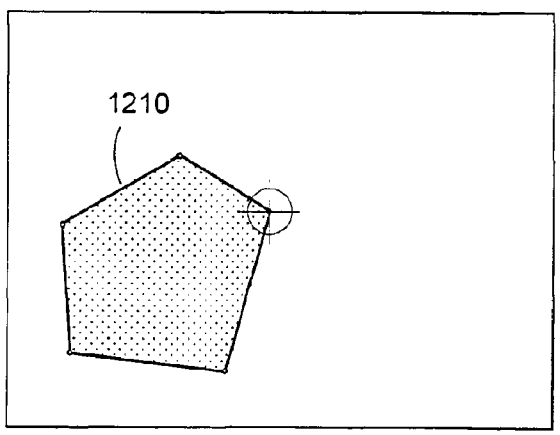

In FIG. 12C, the crosshair 1200 overlaps with the polygon point position 1212 after the coordinates of the position have been recalculated. This recalculation may be performed for all polygon point positions 1211, 1213, 1214 and 1215 so that the exact distance to each of the positions may be obtained by pointing the measurement axis of the optical instrument on each individual position.

Finally, after precisely framing the polygon, the area defined by the polygon may be scanned in predefined steps by tilting or panning the acquisition unit and the measurement axis accordingly. Additionally, if there is a special object feature in the area defined by the polygon, this object feature may be defined and analyzed as described above.

In certain extreme cases, it might be helpful to set a minimum or maximum distance value, e.g. 1 meter or 500 meters, in case the measurement axis points to an obstacle very close by or points to the sky, respectively.

Figure 13:
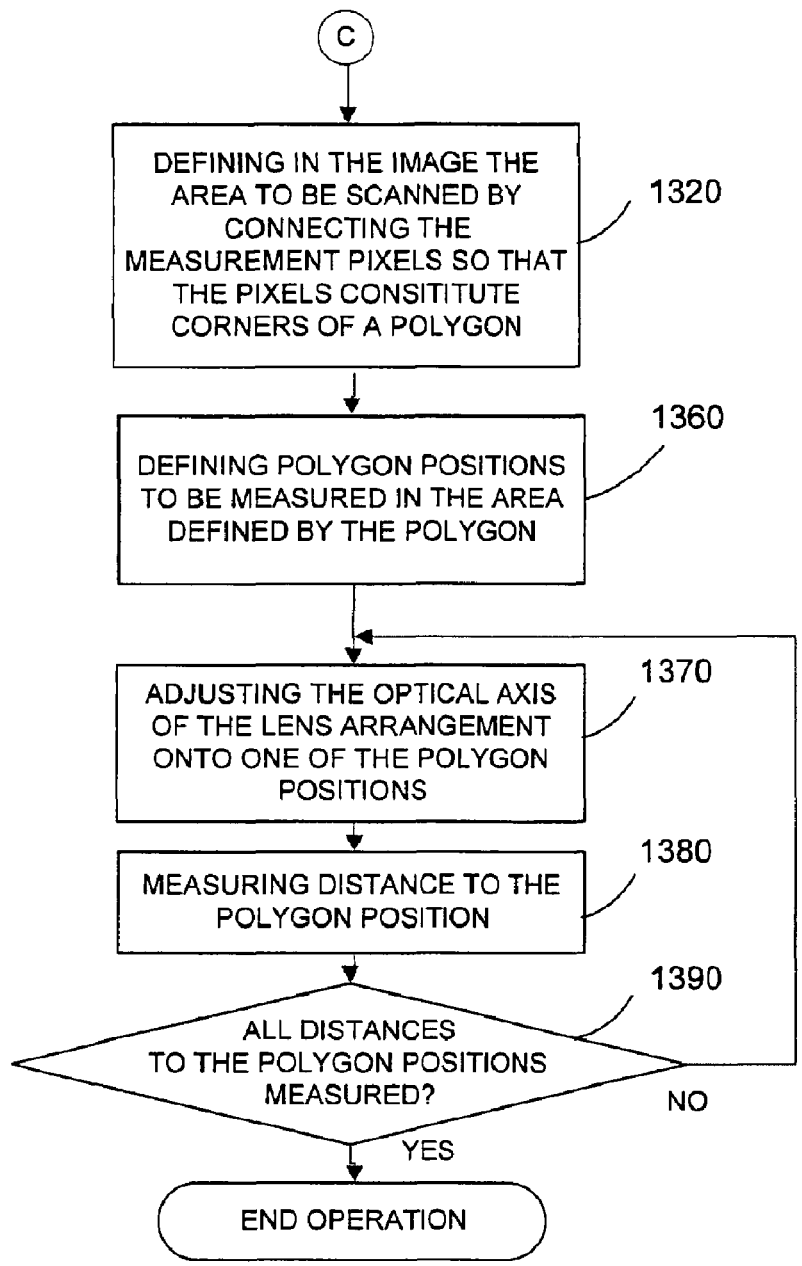
FIG. 13 illustrates operations of a modification of the method shown in FIG. 11.

FIG. 13 illustrates operations of a method according to another embodiment, particularly the operations refer to defining the area to be scanned by connecting measurement pixels to form a polygon, which may also be referred to as framing.

The method described in FIG. 13 is based on the operations described in FIG. 11. However, as will become obvious from the following description, the operation 1120, previously described in FIG. 11, has to be modified.

The method of FIG. 13 starts with operation 1110, wherein an object is sighted with the lens arrangement. Subsequently, in operation 1115, an image of at least part of the object is acquired. Then, in operation 1125, a plurality of measurement pixels of the object within the area are obtained. Further, in operation 1130, the plurality of measurement pixels is converted into an approximation of coordinates of a plurality of positions to be measured assuming a default distance to the plurality of positions. These operations are similar to the operations above and for more details it is referred to the corresponding sections above.

Then, as described in operations 1135, 1140 and 1142, the optical axis of the lens arrangement is adjusted for the first position and the distance to the first position is measured and then the optical axis is adjusted onto the second position and the second position is measured until all distances of the plurality of positions are measured. Then, in operation 1145, the coordinates of the positions are recalculated, based on the measured distance.

Subsequently, in an operation 1320, the area to be scanned in the image is defined by connecting the measurement pixels so that the pixels constitute corners of a polygon. This operation is a modification of the previous operation 1120 and may also be performed between any of operations 1125 and 1360. Considering the plurality of measurement pixels within the area obtained by an operator, the first control element 152 of the control unit 150 may automatically connect the pixels to form a polygon as shown in FIG. 12A.

In an operation 1360, a plurality of polygon positions to be measured are defined in the area defined by the polygon. In other words, after the area to be scanned is defined by the measurement pixels being connected to a polygon, a plurality of polygon positions may be measured according to the required resolution. FIG. 12C, for example, illustrates a constant grid of measurements taken in the area defined by the polygon.

Then, the optical axis of the lens arrangement is adjusted onto the polygon positions to be measured sequentially and for each adjustment and position the distance to the polygon position is measured in operation 1380. The operation 1370 and 1380 are repeated until all polygon positions have been measured.

The above described method may also be understood with respect to FIG. 10. Assuming that the small circles in the sub images 1010 to 1060 represent measurement pixels, the area to be scanned in FIG. 10 may be defined by connecting these measurement pixels to constitute a polygon as shown by the dashed line. Subsequently, a plurality of polygon positions to be measured may be defined in the area, namely on the surfaces 1080 and 1090 or a simple line scan with predetermined step size may be performed.

Optionally, the area to be scanned, for example the surfaces 1080 and 1090 of FIG. 10 or the polygon 1210 of FIG. 12C, may be further analyzed by obtaining an object feature in this area, for example a crack, as shown in FIG. 3. For example, when the intersection of the surfaces 1080 and 1090 of FIG. 10 should be analyzed in more detail, a scan with an increased density of measurement pixels at the intersections may be performed as shown in FIG. 4.

Figure 14:
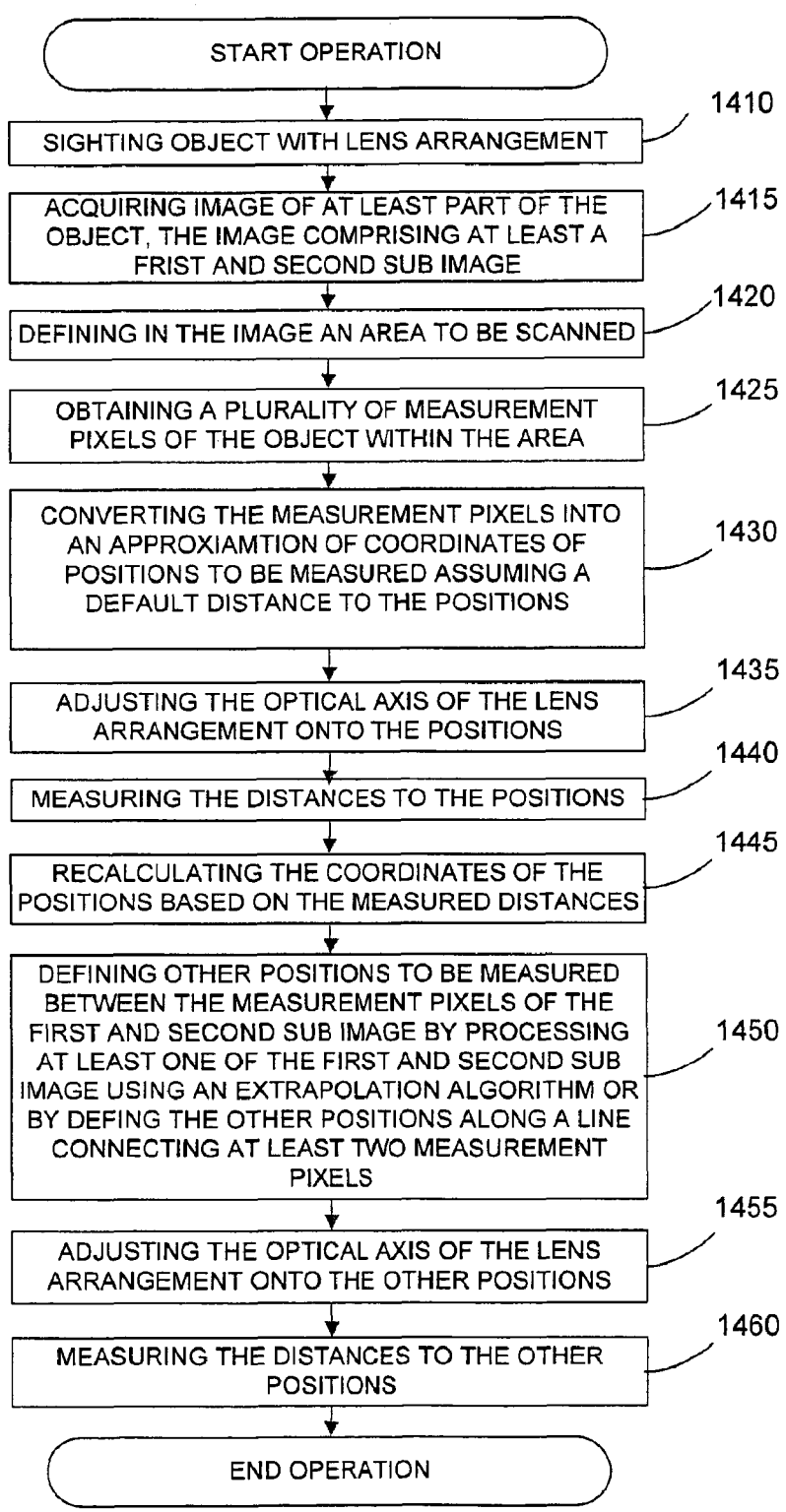
FIG. 14 illustrates operations of a method for obtaining accurate distance and image information according to another embodiment of the invention, combining several aspects of the methods shown in FIGS. 9 and 11.

FIG. 14 illustrates a method for obtaining distance and image information of an object with high accuracy according to another embodiment of the invention. In the method discussed with respect to FIG. 14, several aspects of previous figures, such as FIGS. 2, 9, 10, 11 and 12A to 12C are combined. The optical instrument 100 described in FIG. 1 may be used to perform the method or the instruments illustrated in FIGS. 15 and 16.

In operation 1410, the object is sighted with a lens arrangement. In an operation 1415, an image of at least part of the object is acquired, wherein the image may comprise at least a first and second sub image as previously described with respect to operation 920 of FIG. 9.

In an operation 1420, an area to be scanned is defined in the image and in operation 1425, a plurality of measurement pixels of the object are obtained within the area. The operations 1420 and 1425 have been described several times above, and for more detail it is referred to these sections. Alternatively, the order of these operations may also be reversed.

In an operation 1430, the plurality of measurement pixels obtained in operation 1425 are converted into an approximation of coordinates of a plurality of positions to be measured assuming a default distance to the positions. This operation is similar to operation 1130, however, in this case it is the at least two sub images comprising the plurality of measurement pixels, namely one sub image may comprise all measurement pixels or the measurement pixels may be distributed between the sub images.

In an operation 1435, the optical axis of the lens arrangement is adjusted onto the plurality of positions to be measured and the distances to the plurality of positions are measured in an operation 1440. As described above, the optical axis is adjusted onto one position and the distance to this position is measured and then the optical axis is adjusted to the next position and the distance to the next position is measured until the distances to all the positions are measured.

In an operation 1445, the coordinates of the plurality of positions are recalculated based on the measured distances. This operation is similar to the operation 1145, which has been described in detail with respect to FIG. 11.

Here, it might be added that recalculating the coordinates of the plurality of positions may also be performed as an iterative process, i.e. after the recalculation operation in 1445, the optical axis may again be adjusted onto the positions with the newly obtained coordinates and the distances may be obtained anew until the distances to the positions do not change anymore. However, it has been observed that one distance measurement is usually enough to obtain coordinates of a position with a high accuracy.

In an operation 1450, other positions to be measured are defined between the first and second sub image by processing at least one of the first sub image and the second sub image by defining the other positions along a line connecting at least two measurement pixels or by using an extrapolation algorithm for extrapolating an edge or other object feature of the object in at least one of the first sub image and second sub image detected by a detections algorithm. This operation is similar to the operation 955 of FIG. 9 and to avoid unnecessary repetition, it is referred to operation 955 for more detail.

In operations 1455 and 1460, the optical axis of the lens arrangement is adjusted onto the other positions and the distances to the other positions are measured. In detail, as described above, the optical axis is adjusted onto a first position and the distance to the first position is measured and subsequently, the optical axis is adjusted onto a second position and the distance to the second position is measured, until all of the other positions are measured. A detailed description of the adjustment and measurement has been given above.

In the above-described embodiment at least two sub images are acquired by the camera, since for example the field of view of the camera is not large enough to acquire an image of the whole object at once.

Such a situation is for example presented in FIG. 10, where six sub images are acquired to define an elongated cuboid. Knowing the coordinates of at least one position in each sub image, for example the position corresponding to the small circle in FIG. 10, by recording the horizontal and vertical angles when acquiring the sub image, the size of the whole object may be derived and in particular, it is possible to calculate the number of sub images needed to make up the composite image of the whole object.

Since the outline of the composite image is known by the positions, i.e. the coordinates, at which the sub images 1010 to 1060 have been taken, it is then also possible to calculate the positions of the remaining sub images needed to compose the composite image and the optical axis may be adjusted to such a position and the missing sub images may be acquired.

Figure 15:
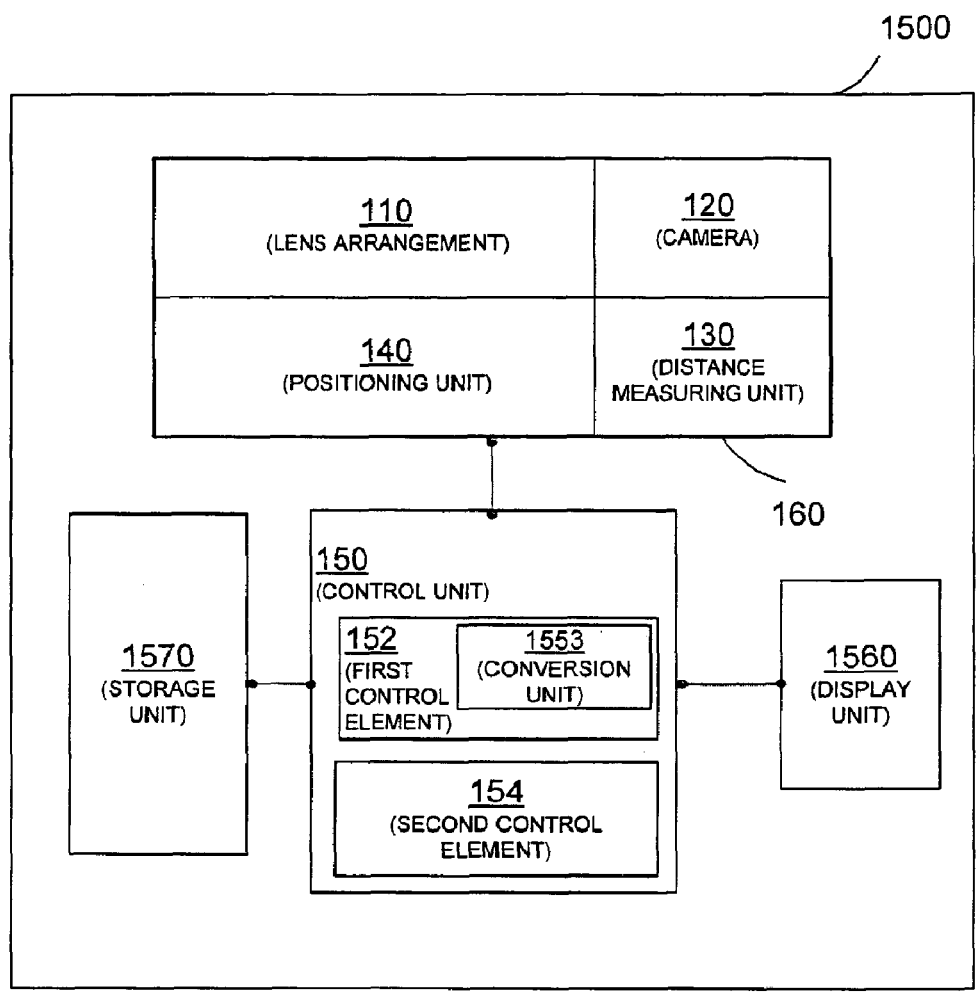
FIG. 15 illustrates elements of an optical instrument according to an embodiment of the invention.
Figure 16:
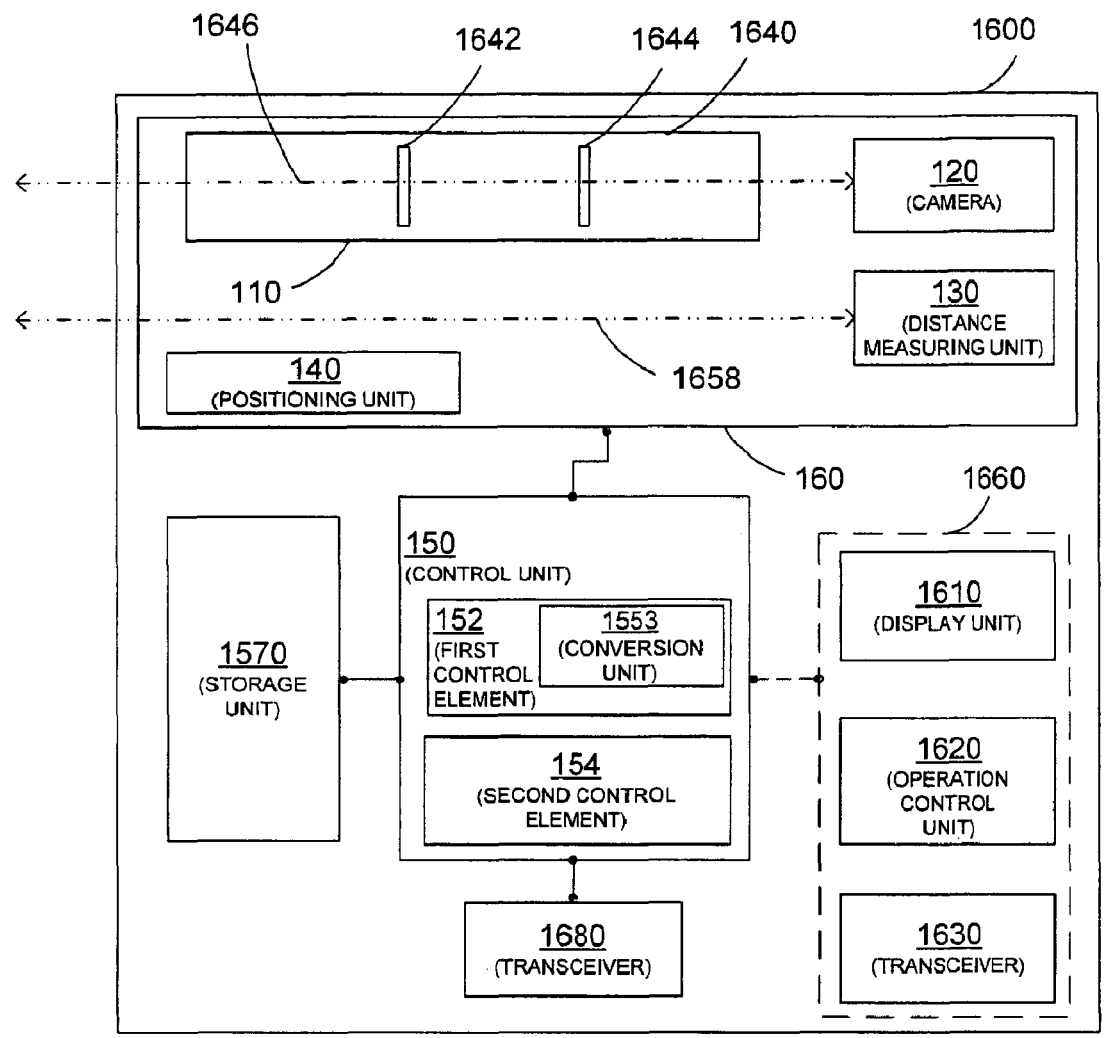
FIG. 16 illustrates elements of an optical instrument according to an embodiment of the invention, particularly an optical instrument with remote control capabilities.

FIGS. 15 and 16 illustrate optical instruments 1500 and 1600 according to other embodiments, similar to the optical instrument 100 of FIG. 1, and instruments 1500 and 1600 may also be used to perform the steps described above.

The optical instrument in FIG. 15 comprises a control unit, an acquisition unit, a storage unit 1570 and a display unit 1560. The acquisition unit 160 with a lens arrangement 110, a camera 120, a distance measuring unit 130 and a positioning unit 140 is identical to the acquisition unit discussed in FIG. 1, and it is referred to FIG. 1 for more details.

The acquisition unit 160 is again connected to the control unit 150 including a first control element 152 and a second control element 154. Furthermore, the first control element 152 is provided with a conversion unit 1553 for converting the plurality of measurement pixels into coordinates of the plurality of positions to be measured.

The conversion unit 1553 may be embodied in the first control element 152 as hardware, such as a hard wired circuit or an ASIC or as software, or a suitable combination of both.

It should be understood that the control unit 150 itself may be realized by a microprocessor, computer or integrated circuit and is not limited to the above. For example, the control unit 150 may be a microprocessor running several software elements, for example, software elements corresponding to the functions of the first control element 152 and the second control element 154, wherein the conversion unit 1553 may be embodied as a software program interfacing with the first control element 152.

In detail, the conversion unit 1553 may perform the conversion using a conversion algorithm based on parts of the following information, the location of the measurement pixels in the image, the optical setup of the instrument, especially the offset of the projection center of the camera and the origin of the optical instrument, the offset of the optical axis and the measurement axis, and the distance to the object.

However, as described above, the conversion may also be performed by a simple conversion table to look up previously recorded information regarding the coordinates of a position corresponding to a location of a measurement pixel in the image. For higher accuracy, it also feasible to provide several different conversion tables for different distances.

These conversion tables as well as the measured image data and distance data may be stored in a storage unit 1570 connected to the control unit 150 to keep the data for post-processing.

The storage unit 1570 may be any suitable or desirable storage device and might be one or a combination of several of the following components, a RAM, a ROM a hard disc, an (E)EPROM, a disc, a flash memory, etc. A flash memory may be suitable to export the data for post-processing, however, other interfaces may be conceivable for the purpose of exporting data, such as a simple I/O interface.

The stored images are referenced either in a local or geo-coordinate system. Further, the position of an acquired image is known with high accuracy and each pixel is precisely referenced. The stored images may be combined with measured three-dimensional information in data post-processing to achieve additional measurement information. A three-dimensional point cloud is just three-dimensional information of the object geometry without semantic information, which may be added with the stored images to increase the reliability of image processing.

The optical instrument 1500 further comprises a display unit 1560 for displaying the required image or sub image, which may be any suitable display unit, such as a simple cathode ray tube (CRT) display or liquid crystal display (LCD).

In a preferred embodiment, three-dimensional point data of a measured position may be superimposed on an image or sub image. The three-dimensional point data may be shown as a three-dimensional point grid, X-, Y-, Z-coordinates, horizontal and vertical angles with distance information, or in other known three-dimensional representations.

FIG. 16 illustrates the optical instrument 1600 according to another embodiment, similar to the optical instrument 100 of FIG. 1.

As illustrated in FIG. 16, the optical instrument 1600 may comprise the control unit 150, the acquisition unit 160, the storage unit 1570, a transceiver 1680 and a detachable remote control unit 1660. The control unit 150 and the storage unit 1570 have been described in detail in FIGS. 1 and 15 and for a detailed description it is referred to FIGS. 1 and 15 to avoid unnecessary repetitions.

FIG. 16 illustrates the acquisition unit 160 of FIGS. 1 and 15 in more detail. The lens arrangement 110 in FIG. 16 comprises two lenses 1642 and 1644, which are placed, preferably removable, in a housing 1640 to form a device similar to a telescope. The optical axis 1646 of the lens arrangement is shown perpendicular to the camera and optimally coinciding with the optical axis of the camera 120.

As described above, the camera 120 may be a CCD or CMOS-type camera or any other suitable imaging device. The measurement axis 1658 of the distance measuring unit 130 is shown parallel to the optical axis 1646 but preferably coincides with the optical axis 1646.

The distance measuring unit 130 has been described in detail before with respect to FIG. 1. The positioning unit 140 is again illustrated in the acquisition unit 160, but as described before, elements of the positioning unit may also be present outside the acquisition unit 160.

Further, the control unit 150 is connected to a first transceiver 1680 for transmitting and receiving data, for example, transmitting acquisition data, e.g. images, to the detachable remote control unit 1660, to be displayed on the display unit 1610. Additionally, the first transceiver 1680 may also receive control data from the detachable remote control unit 1600 controlling the control unit 150 and in particular the first and second control elements.

The detachable remote control unit 1660 may be connected to the control unit 150 physically by fixed lines or by wireless connections, such as radio, WLAN, e.g. IEEE 802.11 or Bluetooth, or any other suitable wireless connection. As indicated by the dashed line, the detachable remote control unit 1660 does not have to form part of the optical instrument 1600 but may be carried around by the operator to control the optical instrument remotely.

In detail, the detachable remote control unit 1660 comprises a display unit 1610, an operation control unit 1620 and a transceiver 1630. The display unit 1610 may be a LCD-display and preferably a touch sensitive display, such as a touch screen serving as a human interface. The operation control unit 1620 may include a focus control, a trigger input, an alphanumeric input device, such as a keyboard, and an aiming control, such as a computer mouse, a joy stick, a track ball, a touch pad or any other suitable device which allows the operator to manually command movement of the optical instrument. The transceiver 1630 may receive acquisition data to be displayed on a display unit 1610 or transmit control data from the operation control unit 1620. Further elements may include a CPU and a battery (not shown).

According to another embodiment a program may be provided including instructions adapted to cause a data processor that may be included in the control unit or the control unit 150 itself to carry out combinations of the above operations.

The program or elements thereof may be stored in a memory, such as the storage unit 1570 of the optical instrument, and retrieved by the processor for execution.

Moreover, a computer readable medium may be provided, in which the program is embodied. The computer readable medium may be tangible such as a disk or other data carrier or may be constituted by signals suitable for electronic, optic or any other type of transmission. A computer program product may comprise the computer readable medium.

It should be understood that the operations described herein are not inherently related to any particular instrument and may be implemented by any suitable combination of components.

The optical instruments, illustrated in FIGS. 1, 15 and 16 and described in detail above, constitute preferred embodiments to perform the operations of the described methods. However, this may not be limited to the same.

It will be apparent to those skilled in the art that various modifications and variations can be made in the instruments and methods of the invention as well as in the construction of this invention without departing from the scope of or spirit of the invention.

The invention has been described in relation to particular examples which are intended in all respects to be illustrative rather than restrictive. Those skilled in the art will appreciate that many different combinations of hardware, software and firmware will be suitable for practicing the present invention.

Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less then all features of a single foregoing disclosed implementation or configuration. Thus, the true scope and spirit of the invention is indicated by the following claims.

What is claimed is:

1. A method for obtaining distance and image information of an object using an optical instrument, the method comprising:
    defining, in an image, an area to be scanned;
    obtaining a plurality of measurement pixels of the object within the area to be scanned, the plurality of measurement pixels corresponding to a plurality of positions to be measured on the object;
    providing a default distance between the plurality of positions and the optical instrument; and
    computing, using a conversion algorithm, an approximation of coordinates of the plurality of positions to be measured based on the default distance between the plurality of positions and the optical instrument, and
    for each position of the plurality of positions:
        adjusting an optical axis of the optical instrument onto each position;
        measuring a distance to each position; and
    determining, using the conversion algorithm, updated coordinates of each position based on the distance.

2. The method of claim 1 wherein the distance to each position is measured using a distance measuring unit, and a measurement axis of the distance measuring unit is substantially parallel to the optical axis of the optical instrument.

3. The method of claim 1 wherein the plurality of measurement pixels of the object is selected by an operator.

4. The method of claim 1 wherein the plurality of measurement pixels of the object is detected by a detection algorithm processing the area in the image.

5. The method of claim 1 wherein the area in the image to be scanned is selected by at least one of an operator or a detection algorithm.

6. The method of claim 1 further comprising detecting a region within the area to be scanned characterized by a high measurement pixel density, a low measurement pixel density, or no measurement pixels.

7. The method of claim 1 wherein the image comprises at least a first sub-image and a second sub-image.

8. The method of claim 7 wherein a portion of the plurality of measurement pixels are present in both the first sub-image and the second sub-image.

9. The method of claim 7 further comprising selecting other positions to be measured in the first sub-image and the second sub-image.

10. The method of claim 9 wherein selecting the other positions to be measured comprises selecting an edge or other object feature of the object in at least one of the first sub-image or the second sub-image using an extrapolation algorithm.

11. An optical instrument for obtaining distance and image information of an object, comprising:
    a lens arrangement for sighting the object;
    a camera aligned with an optical axis of the lens arrangement for acquiring an image of at least part of the object;
    a distance measuring unit adapted to measure a distance to the object along a measurement en axis of the distance measuring unit;
    a positioning unit adapted to adjust the optical axis of the lens arrangement relative to at least one reference axis; and
    a control unit comprising a computer-readable storage medium adapted to store a plurality of instructions, which when executed by a processor cause the processor to perform a measurement, the plurality of instructions comprising:
        instructions that cause the processor to define an area, within the image, to be scanned;
        instructions that cause the processor to obtain a plurality of measurement pixels of the object within the area to be scanned, the plurality of measurement pixels corresponding to a plurality of positions to be measured on the object;
        instructions that cause the processor to select a default distance between the plurality of positions and the optical instrument;

instructions that cause the processor to compute, using a conversion algorithm, an approximation of coordinates of the plurality of positions to be measured based on the default distance between the plurality of positions and the optical instrument, and for each position of the plurality of positions:

instructions that cause the processor to adjust the optical axis of the lens arrangement onto each position;

instructions that cause the processor to measure a distance to each position; and instructions that cause the processor to determine, using the conversion algorithm, accurate coordinates for each position based at least on the distance.

12. The optical instrument of claim 11 wherein the measurement axis of the distance measuring unit is substantially parallel to the optical axis of the lens arrangement.

13. The optical instrument of claim 11 wherein the instructions that cause the processor to obtain a plurality of measurement pixels of the object within the area to be scanned comprise instructions that cause the processor to receive from an operator a selection of the plurality of measurement pixels.

14. The optical instrument of claim 11 wherein the instructions that cause the processor to obtain a plurality of measurement pixels of the object within the area to be scanned comprise instructions that cause the processor to execute a detection algorithm for detecting the plurality of measurement pixels in the area to be scanned.

15. The optical instrument of claim 11 wherein the plurality of instructions further comprise instructions that cause the processor to execute a detection algorithm to detect a region within the area to be scanned.

16. The optical instrument of claim 15 wherein the region is characterized as having one of high measurement pixel density, low measurement pixel density, or no measurement pixels.

17. The optical instrument of claim 11 wherein the image comprises at least a first sub-image and a second sub-image.

18. The optical instrument of claim 17 wherein a portion of the plurality of measurement pixels are present in both the first sub-image and the second sub-image.

19. The optical instrument of claim 18 wherein the plurality of instructions further comprise instructions that cause the processor to select other positions to be measured from the plurality of measurement pixels.

20. The optical instrument of claim 19 wherein the plurality of instructions further comprise instructions that cause the processor to execute an extrapolation algorithm for extrapolating an edge or other object feature of the object in at least one of the first sub image or second sub image.

* * * * *